United States Patent
Douglas et al.

(10) Patent No.: US 10,013,754 B2
(45) Date of Patent: Jul. 3, 2018

(54) METHOD AND APPARATUS FOR UTILIZING WHEEL PROFILE DATA DURING WHEEL ASSEMBLY SERVICE PROCEDURES

(71) Applicant: Hunter Engineering Company, St. Louis, MO (US)

(72) Inventors: Michael W. Douglas, St. Charles, MO (US); Sean D. Reynolds, St. Louis, MO (US); Gregory F. Meyer, St. Louis, MO (US); Daniel R. Dorrance, Ballwin, MO (US)

(73) Assignee: Hunter Engineering Company, St. Llouis, MO (US)

( * ) Notice: Subject to any disclaimer, the term of this patent is extended or adjusted under 35 U.S.C. 154(b) by 403 days.

(21) Appl. No.: 14/455,564

(22) Filed: Aug. 8, 2014

(65) Prior Publication Data
US 2015/0042787 A1 Feb. 12, 2015

Related U.S. Application Data

(60) Provisional application No. 61/864,360, filed on Aug. 9, 2013, provisional application No. 61/941,038, filed on Feb. 18, 2014.

(51) Int. Cl.
*G01B 11/25* (2006.01)
*G01M 1/32* (2006.01)
(Continued)

(52) U.S. Cl.
CPC ........ *G06T 7/0008* (2013.01); *G01B 11/2513* (2013.01); *G01M 1/326* (2013.01);
(Continued)

(58) Field of Classification Search
CPC .. G01M 1/326; G01M 11/081; G01M 17/013; G06T 7/0008; G06T 2207/10004;
(Continued)

(56) References Cited

U.S. PATENT DOCUMENTS 5,054,918 A * 10/1991 Downing ........... G01B 11/2504
33/203
7,199,873 B2 4/2007 Braghiroli
(Continued)

FOREIGN PATENT DOCUMENTS

EP 0565320 A2 10/1993
EP 2110656 A1 * 10/2009 .......... G01M 17/027

OTHER PUBLICATIONS

John Bean product literature, "RFV2000 Fully Automated Diagnostic Wheel Balancing System", Form No. SS3259G, Apr. 2013, 4 pages.

*Primary Examiner* — Behrooz Senfi
*Assistant Examiner* — Kathleen Walsh
(74) *Attorney, Agent, or Firm* — Sandberg Phoenix & von Gontard P.C.

(57) ABSTRACT

Methods and apparatus for utilizing vehicle wheel assembly surface profile data acquired by a vehicle wheel service system from a non-contact imaging sensor and a projected pattern of optically distinct elements on the vehicle wheel assembly surface to identify one or more features of the vehicle wheel assembly, to receive operator input, and to facilitate the placement of imbalance correction weights onto the vehicle wheel assembly surface.

20 Claims, 9 Drawing Sheets

(51) Int. Cl.
*G01M 11/08* (2006.01)
*G06T 7/00* (2017.01)
*G01M 17/013* (2006.01)

(52) U.S. Cl.
CPC ........ *G01M 11/081* (2013.01); *G01M 17/013* (2013.01); *G06T 7/0004* (2013.01); *G06T 2207/10028* (2013.01)

(58) Field of Classification Search
CPC . G06T 2207/10028; G06T 2207/30248; G06T 7/0004; G06T 7/0042; A61K 49/0004; C07D 513/04; G01B 11/2513; G01B 11/2755
USPC .................................................... 348/95, 148
See application file for complete search history.

(56) References Cited

U.S. PATENT DOCUMENTS

| | | | |
|---|---|---|---|
| 7,199,880 B2 | 4/2007 | Braghiroli | |
| 7,269,997 B2 | 9/2007 | Dale, Jr. et al. | |
| 7,355,687 B2* | 4/2008 | Voeller | B60C 11/24 356/139.09 |
| 7,466,430 B2* | 12/2008 | Braghiroli | G01M 1/02 356/601 |
| 7,495,755 B2* | 2/2009 | Voeller | B60C 11/24 356/139.09 |
| 7,584,659 B1* | 9/2009 | Rogers | G01M 1/32 73/462 |
| 7,686,403 B2* | 3/2010 | Douglas | G01M 1/16 301/5.21 |
| 7,738,120 B2 | 6/2010 | Braghiroli | |
| 8,111,387 B2* | 2/2012 | Douglas | G01B 11/25 356/139.09 |
| 8,613,303 B1* | 12/2013 | Hanneken | B60C 25/138 157/1.17 |
| 9,188,429 B2* | 11/2015 | Braghiroli | G01M 1/225 |
| 2004/0039544 A1* | 2/2004 | Merrill | G01B 11/275 702/147 |
| 2004/0050159 A1* | 3/2004 | Corghi | G01M 1/02 73/462 |
| 2004/0165180 A1* | 8/2004 | Voeller | B60C 11/24 356/139.09 |
| 2005/0055153 A1* | 3/2005 | Braghiroli | G01M 1/225 701/124 |
| 2005/0068522 A1* | 3/2005 | Dorrance | G01B 11/2755 356/139.09 |
| 2005/0132786 A1* | 6/2005 | Cullum | G01M 1/02 73/146 |
| 2006/0028638 A1* | 2/2006 | Douglas | G01M 1/26 356/139.09 |
| 2006/0042380 A1* | 3/2006 | Douglas | G01M 1/02 73/460 |
| 2007/0068259 A1* | 3/2007 | Douglas | G01M 1/326 73/662 |
| 2007/0124949 A1* | 6/2007 | Burns, Jr. | G01B 11/2509 33/288 |
| 2007/0131026 A1* | 6/2007 | Douglas | G01M 1/02 73/462 |
| 2008/0007722 A1* | 1/2008 | Golab | G01B 11/2545 356/139.09 |
| 2008/0297777 A1* | 12/2008 | Sotgiu | B60C 25/0554 356/139.09 |
| 2008/0319706 A1* | 12/2008 | Uffenkamp | G01B 11/275 702/150 |
| 2009/0033949 A1* | 2/2009 | Braghiroli | B60C 25/0554 356/635 |
| 2009/0080703 A1* | 3/2009 | Hammerschmidt | G06T 7/0004 382/104 |
| 2009/0279077 A1* | 11/2009 | Douglas | G01B 11/25 356/139.09 |
| 2010/0060885 A1* | 3/2010 | Nobis | G01B 11/2755 356/139.09 |
| 2010/0303336 A1* | 12/2010 | Abraham | G01B 11/2755 382/154 |
| 2012/0042724 A1* | 2/2012 | Lipponer | G01M 17/027 73/462 |
| 2014/0157895 A1* | 6/2014 | Braghiroli | G01M 1/225 73/462 |
| 2014/0165721 A1 | 6/2014 | Douglas | |

\* cited by examiner

Figure 5 – PRIOR ART

METHOD AND APPARATUS FOR UTILIZING WHEEL PROFILE DATA DURING WHEEL ASSEMBLY SERVICE PROCEDURES

CROSS-REFERENCE TO RELATED APPLICATIONS

The present application is related to, and claims priority from, U.S. Provisional Patent Application Ser. No. 61/864,360 filed on Aug. 9, 2013, and which is herein incorporated by reference.

The present application is further related to, and claims priority from, U.S. Provisional Patent Application Ser. No. 61/941,038 filed on Feb. 18, 2014, and which is herein incorporated by reference.

STATEMENT REGARDING FEDERALLY SPONSORED RESEARCH

Not Applicable.

BACKGROUND OF THE INVENTION

This invention relates generally to vehicle wheel service systems and more particularly, to methods and systems for operation of vehicle wheel service systems such as wheel balancers and tire changers configured with machine vision sensors to measure a wheel assembly, to guide an operator during placement of imbalance correction weights, and to confirm correct placement of the imbalance correction weights on the wheel rim after installation.

At least some known vehicle wheel balancers are capable of optically scanning a vehicle wheel assembly consisting of at least a wheel rim mounted to a spindle shaft for rotation about an axis. A surface on the wheel assembly is sensed by means of a light beam such as a laser emitted by a light source, illuminating a single point on the surface of the wheel assembly, such that reflected light is received by a position-sensitive receiver. The spacing of the sensed surface or location relative to a reference point is then measured from the directions of the emitted and reflected light beams. In some systems, an actuator causes synchronous pivotal movement of the light source and the receiver about a common pivot axis, and the measurement values of the receiver are fed to an electronic evaluation system to ascertain the sensed location on the vehicle wheel from a reference location. By positioning the light source and the receiver together facing towards various positions on the wheel rim, a contour of the wheel rim, and in particular an internal contour of the wheel rim, can be determined.

However, a scanning device that includes a plurality of moving parts, actuators, and bearings is prone to wear and misalignment requiring periodic maintenance, recalibration, and/or verification of proper operation, which is expensive and time-consuming. The time required for the scanned measurement can also be long, even longer than an imbalance measurement procedure, and longer than manually entering the dimensions using conventional electro-mechanical systems such as measurement arms.

Other known automotive wheel service systems utilize a planar light beam, such as a sheet of light, which is projected to impinge on a stripe-shaped impingement area on the surface of the wheel assembly. Light reflected from the stripe-shaped impingement area is received at an imaging sensor mounted outside of the projection plane, and processed to evaluate the shape of the illuminated stripe-shaped impingement area. Deviations in the shape of the illuminated stripe-shaped impingement area from a straight line, as seen by the imaging sensor, are interpreted as representations of the surface contour onto which the light is projected.

However, scanning devices that rely upon a projected planar light beam and observation of deviations in the resulting reflected light from a linear image require that the imaging sensor be positioned outside the plane of the projected light beam to provide the imaging sensor with a field of view sufficient to observe small deviations from a straight line in the reflected light resulting from small contours of the surface onto which the light is projected. These spacing requirements can be difficult to accommodate in compact vehicle service systems.

Independent of the means by which the data is acquired, vehicle wheel balancers utilize contour data to determine suitable axial placement locations for imbalance correction weights during an imbalance correction procedure. An operator may further identify to the system a desired axial placement location for an imbalance correction weight by pointing to the desired position with a finger or indicator wand, such as shown in U.S. Pat. No. 7,495,755 B2. Commonly, the process of installing imbalance correction weights is a manual process, requiring the operator to follow instructions for weight selection and proper placement provided by the vehicle wheel balancer in response to the measured imbalance of the wheel assembly. Depending upon the operator's level of skill, attentiveness, and attention to detail, the imbalance correction weights may not be installed precisely where indicated, leaving the wheel assembly with an unintended measure of residual imbalance. For example, when a vehicle wheel balancer directs placement of a first imbalance correction weight on an "inner correction plane" and a second imbalance correction weight on an "outer correction plane", an inattentive operator may misplace the weights by installing an imbalance correction weight at the wrong correction plane.

Accordingly, it would be advantageous for automotive vehicle wheel balancers to utilize optical rim contour measurement components to provide data associated with a vehicle wheel assembly in addition to measuring rim profiles, to facilitate correct installation of imbalance correction weights by providing the operator with real-time visual cues as to the correct axial placement location of identified imbalance correction weights, and which can quickly identify, to an operator, incorrect placement locations and/or applied incorrect weight amounts (if the weight dimensions are known).

BRIEF SUMMARY OF THE INVENTION

The present application sets forth improvements and associated methods of operation, for vehicle wheel service systems which include a spindle shaft configured to receive a vehicle wheel assembly for rotation about an axis, a source of optical energy configured to project a pattern of light consisting of a plurality of discrete optically detectable elements towards a surface of a vehicle wheel assembly mounted on the spindle shaft, and an imaging sensor positioned a known or determinable distance and orientation from the source of optical energy. The imaging sensor is configured to acquire an image of at least some of the plurality of discrete optically detectable elements projected onto the surface within a field of view of the imaging sensor. A processor associated with the wheel service system is configured with software instructions to receive image data from the imaging sensor to determine a positional relationship between the imaging sensor and at least two of the plurality of discrete elements.

In one embodiment, the processor is further configured to identify from the determined information the presence or absence of a vehicle wheel mounted to the spindle shaft, based on the presence or absence of observed discrete optically detectable elements within a spatial region in which a mounted vehicle wheel assembly surface is expected. If a vehicle wheel assembly is detected, the processor may optionally further determine if the detected vehicle wheel assembly is mounted to the spindle shaft in a normal mounting orientation or an incorrect mounting orientation based on the location of specific features, such as wheel rim spokes, detected in the acquired images.

In a further embodiment, the vehicle wheel service system is configured for determining a runout parameter of the vehicle wheel assembly mounted on the spindle shaft. The processor of the vehicle wheel service system is configured with software instructions to evaluate images of the projected pattern on the vehicle wheel assembly surface to identify a spatial position for one or more circumferential features of the vehicle wheel assembly surface at a plurality of axial positions. A relative deviation of each determined spatial position, in an axial and/or radial direction, from an average spatial position for the circumferential features in the set of evaluated images is calculated, identifying axial and/or radial runout of the vehicle wheel assembly.

In another embodiment, the vehicle wheel service system is configured to facilitate the detection and/or identification of non-circumferential features of a vehicle wheel assembly mounted to a spindle shaft, such as installed imbalance correction weights, wheel spokes, or a valve stem location. The source of optical energy directs a pattern of discrete optically detectable elements onto a rim surface of the vehicle wheel assembly, while the imaging sensor acquires a plurality of images of at least some of the plurality of discrete elements as they are reflected from the wheel assembly. The processor associated with the vehicle wheel service system is configured with software instructions to determine a positional relationship between the imaging sensor and at least two of the plurality of discrete elements from the acquired images, and to utilize the determined information to detect the presence of one or more discrete, non-circumferential features on the surface of the vehicle wheel assembly such as by detecting a localized deviation from an average or expected surface profile of the vehicle wheel assembly.

In a further embodiment, additional feature detection or measurement systems may be included with the vehicle service system to observe and acquire information associated with at least both the axially inner and axially outer surfaces of a vehicle wheel assembly. Profile data acquired from inner and outer measurement systems can be utilized independently, so as to identify axial and radial runout associated with each of the inner and outer rim lips of the wheel assembly. Or, by determining or characterizing a relationship between each measurement system, the data acquired from each measurement system can be utilized in combination to identify a variety of features or characteristics of the vehicle wheel assembly, such as a complete rim surface profile or overall dimensions. Data from one measurement system can be utilized to facilitate the processing of images acquired by another measurement system. For example, identification of the presence of a flange for receiving imbalance correction weights on one lip of a wheel assembly can aid in identifying the presence of a flange in data representative of the opposite lip of the wheel assembly, by identifying the shape and radial location of the flange which is to be expected on the opposite lip. Similarly, data from an outer profile measurement system can be combined with data from an inner profile measurement system to provide a representation of the wheel assembly, including tire surface characteristics, spoke locations, spoke thickness, a complete rim profile, the presence or absence of rim flanges, installed imbalance correction weights on the inner rim surface, the inner rim flange, and the outer rim flange, as well as the presence of any other non-circumferential features or discontinuities on the wheel assembly.

In another embodiment, a vehicle wheel service system is configured to receive operator input associated with a vehicle wheel assembly mounted to a spindle shaft. The processor associated with the vehicle wheel service system is configured with software instructions to detect, and respond to, an operator's identification of a point or region on said portion of said wheel assembly illuminated by the projected pattern, based on observed changes or disruptions in the observed images of the projected pattern which result from the presence of an object placed in contact with, or proximity to, the wheel assembly illuminated surface.

In a further embodiment, the present disclosure sets forth an improvement to, and an associated method for operating, a vehicle wheel balancer system having an optical projection and imaging system configured to acquire surface contour information from a vehicle wheel assembly. The improvement adapts the optical projection and imaging system to provide an operator with a visual indication of a selected axial placement location for an imbalance correction weight. During placement of an imbalance correction weight, the optical projection system is activated to illuminate the surface of the wheel assembly on which an imbalance correction weight is to be installed. The illumination is monitored during the installation process by the processing system of the vehicle wheel balancer to identify a disturbance which corresponds the presence of an imbalance correction weight or the operator's hand. The axial location of the disturbance is compared with the axial location at which the imbalance correction weight should properly be installed, and a suitable response signal is provided to the operator. The response signal may be in the form of an audible signal increasing or decreasing in tone according to the proximity to the correct axial location, or in the form of a visual signal, such as by altering a pattern or appearance of illumination on the surface of the wheel assembly, such as to provide the illusion of movement.

In a further embodiment, the processor of the vehicle wheel balancer system is configured to utilize the optical projection and imaging system to detect the axial location of an installed imbalance correction weight as a change in the surface contour of the vehicle wheel assembly, following installation by an operator, and to provide a suitable warning or indication to the operator if the imbalance correction weight is detected at an incorrect axial location, or as having incorrect characteristics such as dimensions or weight.

In a further embodiment, the processor of the vehicle wheel balancer system is be configured with suitable software instructions to automatically adjust the identified size and/or placement location of an uninstalled second imbalance correction weight displayed to an operator if a first imbalance correction weight is found to be installed at an incorrect location, or alternatively, in a "live" display which is responsive to the observed position of the first imbalance correction weight as the operator moves it towards a placement location on the wheel assembly surface. The adjusted identified size and/or placement location for the uninstalled second imbalance correction weight corrects an imbalance in the vehicle wheel assembly determined to result from the installation of the first imbalance correction weight at the observed location.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
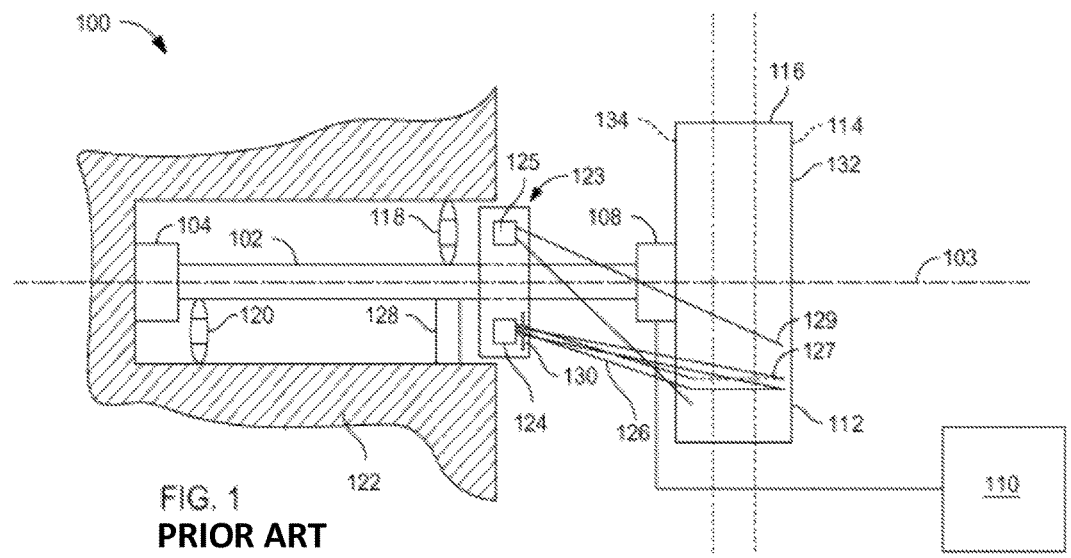
FIG. 1 is a perspective view of a prior art vehicle service system for non-contact measurement of a wheel profile with an exemplary configuration of a light source and an imager to view an inner surface of the wheel assembly.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Those of ordinary skill in the vehicle wheel balancer field will understand that in the context of the present disclosure, a vehicle wheel assembly is best described with reference to a cylindrical coordinate system which is symmetrical about the axis of rotation for the vehicle wheel assembly. Hence, the term "axially" as used herein refers to movement, vectors, or surfaces (such as found on the wheel rim cylindrical body) which are generally parallel to the axis of rotation for the vehicle wheel assembly, and are not limited to those which are on or along the axis of rotation itself.

FIG. 1 is a perspective view of a prior art wheel servicing system 100 for use with the embodiments of the present invention. Vehicle wheel servicing system 100 as shown is illustrative only, as it will be recognized that the particular devices and structures used to obtain dimensional and imbalance information related to a rotating body may be readily changed without changing embodiments of the present invention. Exemplary vehicle wheel servicing systems include wheel balancers and tire changes.

In an exemplary embodiment, wheel servicing system 100, such as a wheel balancer, includes a rotatable shaft or spindle 102 having a longitudinal axis 103 about which shaft 102 rotates. Spindle shaft 102 may be driven by a suitable drive mechanism such as a motor 104 directly coupled to shaft 102 as shown or coupled to shaft 102 through a power transmission device such as a drive belt (not shown). Mounted on, or proximate to, shaft 102 is a position indictor such as a conventional optical shaft encoder 108 which provides speed and rotational position information to a central processing unit 110.

During the operation of wheel balancing, at the end of the shaft 102, a wheel assembly 112 under test is removably mounted for rotation. Wheel assembly 112 may comprise a wheel 114 alone or in combination with a tire 116 mounted thereon. To determine the wheel assembly imbalance, wheel servicing system 100 includes at least one imbalance force sensor 118 and/or 120, such as a piezoelectric sensor or a strain gauge, coupled to shaft 102 and mounted on a balancing system base 122. The force sensors 118 and/or 120, together with other sensors that may be operatively included with wheel servicing system 100 to facilitate performing other wheel servicing operations, are each operatively in communication with the central processing unit 110.

Figure 2A:
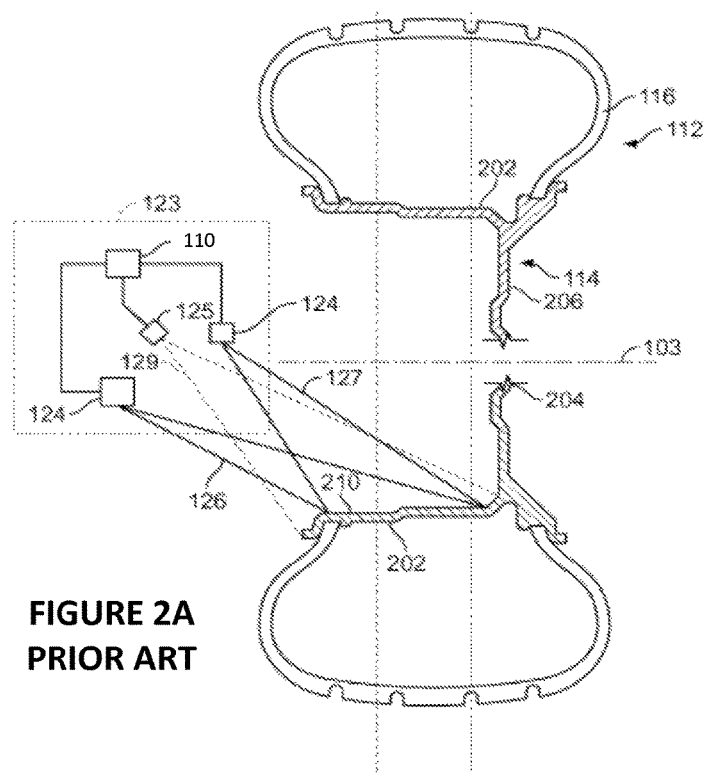
FIG. 2A is a cross-sectional view of a wheel assembly and the prior art wheel profile measurement system shown in FIG. 1.
Figure 5:
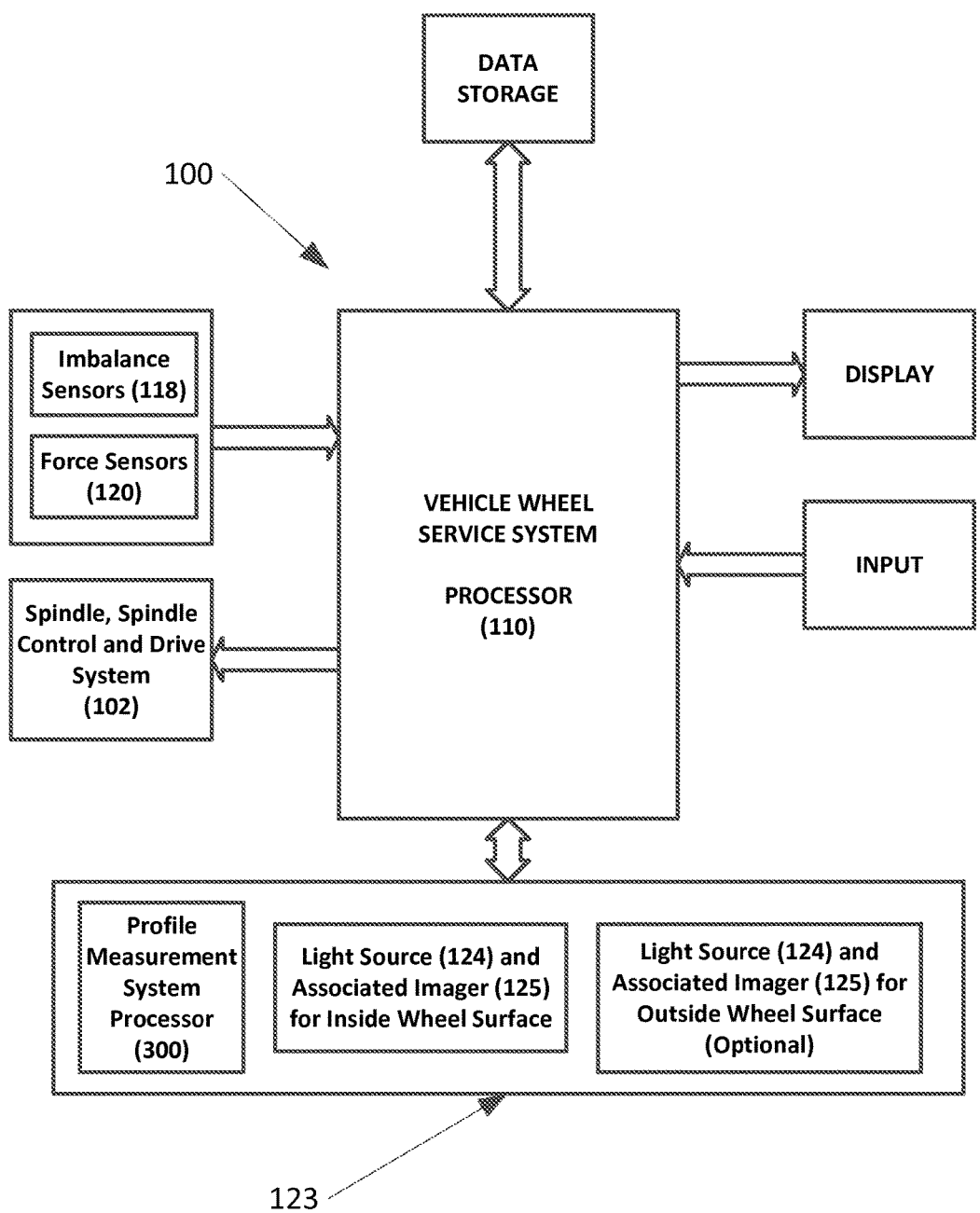
FIG. 5 is a block diagram of the components of a prior art vehicle wheel service system including a wheel profile measurement system.

To facilitate wheel imbalance correction or other procedures that may be accomplished using wheel servicing system 100, a wheel profile measurement system 123 may be used as shown and described in U.S. Pat. No. 8,111,387 B2 to Douglas et al. which is herein incorporated by reference. In the exemplary embodiment, such as shown in FIG. 2a, the wheel profile measurement system 123 includes at least one light source 124, an associated imager 125, and an optional processor 300 (shown in FIG. 5). Processor 300, if present, can be configured with suitable software instructions to control the operation of the light source and associated imager 125, as well as to perform some processing of the acquired images. Alternatively, the processor 110 of the vehicle wheel service system 100 can be configured with suitable software instructions to perform the same tasks in place of a dedicated processor 300 if sufficient computational capacity is available.

Light source 124 is configured to project light 126 towards wheel assembly 112.

Figure 2B:
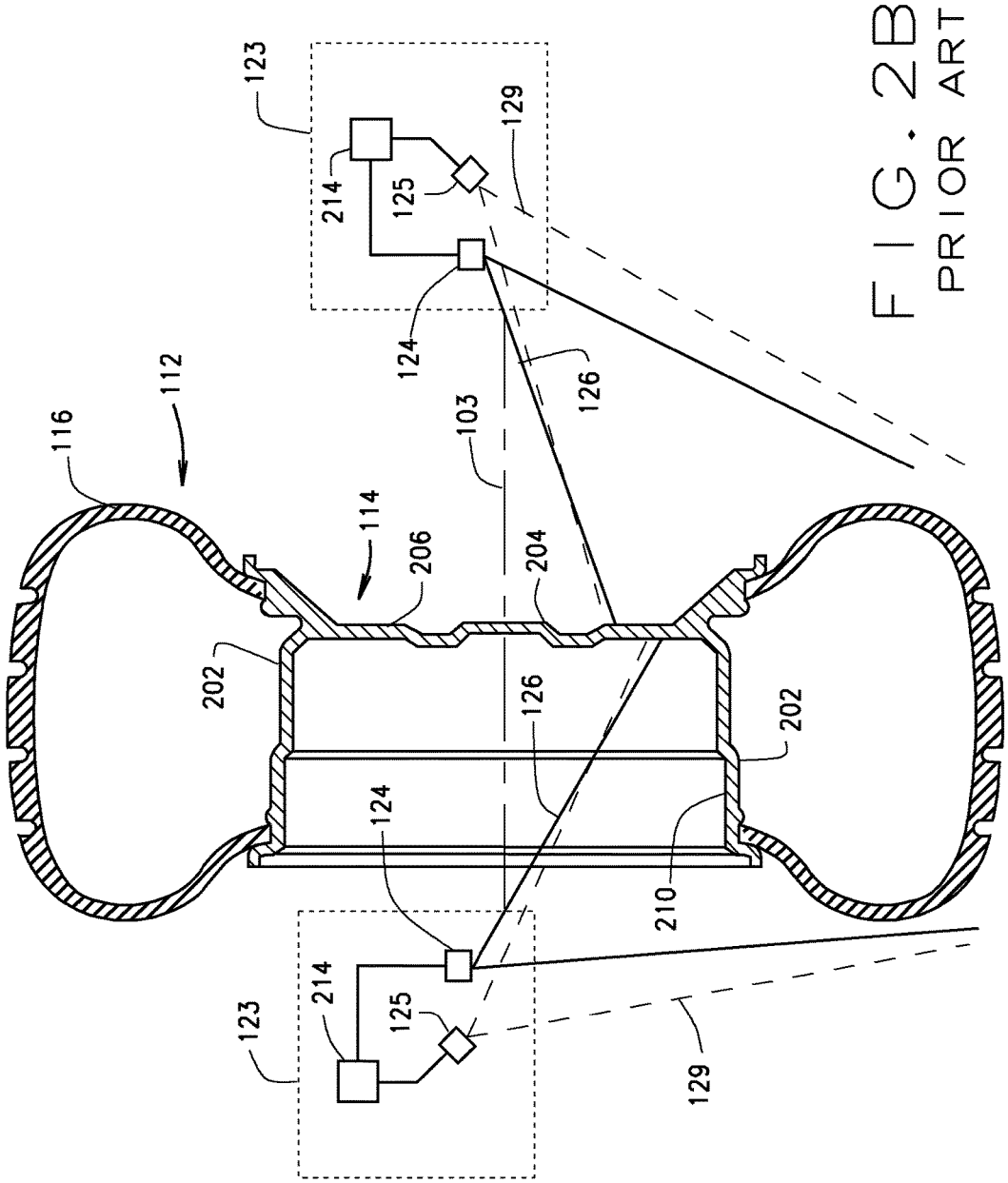
FIG. 2B is a cross-section view similar to FIG. 2A, illustrating a second exemplary configuration of prior art light sources and imagers to view both inner and outer surfaces of the wheel assembly.

In one embodiment, light source 124 is configured to project a pattern of discrete optically detectable elements (shown in FIGS. 3 and 4) towards a spatial region in which a portion of wheel 114 and/or tire 116, such as the inside surface of the wheel rim and tire is expected to be present for a wheel assembly mounted to the spindle shaft, as seen in FIG. 2A. Optionally, one or more additional light sources 124 and associated imagers 125 may be disposed at various locations on the vehicle wheel servicing system 100, such as seen in FIG. 2B, to illuminate and view from different orientations, the spatial regions expected to contain portions of the spindle-mounted wheel rim and tire, such as, but not limited to, the tire circumferential tread, sidewalls, spokes, or the wheel assembly outside surfaces.

As used herein, the "pattern of discrete elements" defines a grouping of a plurality of discrete optically detectable elements that are projected in one or more linear, arcuate or random orientations spaced along wheel 114 and/or tire 116. Light source 124 may include one or more light emitting devices (not shown in FIG. 1) in a single housing. In alternate embodiments, the light source 124 may be a laser, an LCD projector, a DLP, or any other suitable source of illumination configured to project a sheet or fan of light to produce a generally continuous line across the surface of the wheel 114 and/or tire 116, or to illuminate a region on the surface of the wheel 114 and/or tire 116, such as by the projection of a two-dimensional image or illuminated point cloud.

The associated imager 125 includes a field of view (FOV) 129a and is positioned such that the field of view 129a encompasses one or more patterns of optically detectable elements, lines, or images projected onto a portion of wheel 114 and/or tire 116 from the corresponding light source 124. The associated imager 125 may be disposed in a known or determinable relationship to the light source 124 from which positional data associated with observed optically detectable elements, such as spacing between adjacent optically detectable elements, can be calculated, or may be a stereoscopic imaging system capable of determining positional data from observations of the optically detectable elements along different viewing axis.

In an embodiment, illustrated generally in FIG. 2A an imager 125 is configured to acquire an image of the optically detectable elements, lines, or images projected onto a portion of wheel 114 and/or tire 116. Optionally, multiple sets of light sources 124 and associated imagers 125 may be disposed in operative proximity to a vehicle wheel assembly as necessary to provide sufficient coverage for illumination and observation of each intended surface of the wheel 114 and/or tire 116. For example, as shown in FIG. 2B, a vehicle wheel service system may include a profile measurement system 123 with a first light source 124 and associated imager 125 disposed to illuminate and observe an inside tire sidewall and rim surface of a wheel assembly mounted to a spindle shaft, together with a second profile measurement system 123 with a second light source 124 and associated imager 125 disposed with a second field of view 129 to illuminate and observe an outside surface of the wheel rim and tire sidewall. Yet another light source and associated imager (not shown) may be disposed to illuminate and observe a tread surface of a tire mounted to the wheel rim.

Light source 124 is configured to project a light pattern 126 of discrete optically detectable elements, lines, or images by using, for example, but not limited to, a diffractive optical element (DOE) 130 positioned in the optical path. In other embodiments, a slit aperture, a lens, hologram generation, and/or mirrors are configured to project light in a pattern of discrete elements (e.g., can be visible light or non-visible spectrum such as infrared). By using a plurality of discrete optically detectable elements, the optical receiver system can remain in a fixed position and the wheel profile can be determined using just one acquired image. For the present invention the DOE is preferred since it provides the most efficient use of available light (no blocked light) and is not susceptible to diffractive edge distortion caused by slit apertures.

FIGS. 2A and 2B are cross-sectional views of a wheel assembly 112 and one or more prior art wheel profile measurement systems 123 (shown in FIG. 1). Wheel assembly 112 includes a wheel rim 202 for receiving the tire 116 to form the wheel assembly 112. A wheel hub 204, axially integrated with the rim 202 by an annular web of spokes 206 permits coupling wheel assembly 112 to the shaft 102. The wheel rim 202 includes an inner rim surface 210 extending circumferentially about an interior of wheel rim 202. Once mounted to the simple shaft, the patterns are projected by the light source 124 onto at least the inner surface 210 of rim 202 which is present in the spatial region associated with a spindle-mounted wheel assembly. The discrete optically detectable elements may appear projected onto surface 210 as alphanumeric elements, shapes, indicia, dots, line segments, symbols, geometric shapes, icons, images, or combinations thereof. Additionally, the discrete optically detectable elements of each pattern may be projected in different colors and/or wavelengths.

Because a plurality of optically detectable elements are projected onto the wheel assembly surfaces at the same time, some optical trait must be unique for at least one optically detectable element such that the processing algorithms can recognize which optically detectable elements are being used in each triangulation computation. In other words, the projected angle must be determined for each optically detectable element processed in an acquired image. Various means to accomplish this as shown in the '387 Douglas patent include, but are not limited to: providing one or more a uniquely shaped optically detectable elements, providing a missing element (a recognizable gap in the pattern), and providing an uneven but known light ray angle spacing in an encoded manner. Other techniques for providing recognizable optical elements may additionally include projecting elements at different frequencies of light and modulating the illumination of projected elements in a known or determinable sequence.

Figure 3:
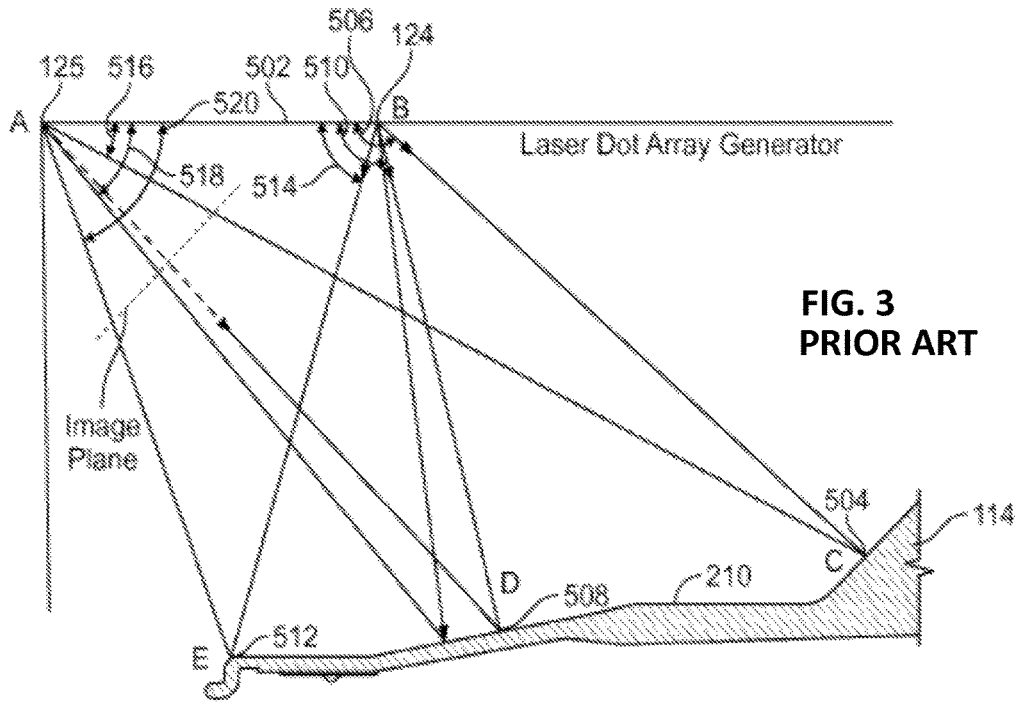
FIG. 3 is a schematic view of an enlarged portion of a wheel rim illustrating an exemplary configuration of a light source and an imager of the prior art wheel profile measurement system shown in FIG. 1.

FIG. 3 is a schematic view of the prior art wheel profile measurement system and an enlarged portion of wheel 114 illustrating an exemplary configuration of the light source 124 and the imager 125 for determining a profile of wheel 114. In the exemplary embodiment, light source 124 is positioned a known or determinable distance vector 502 away from imager 125 and generates and projects a line of discrete optically detectable elements onto surface 210. A first discrete optically detectable element 504 is projected onto surface 210 at a first determinable angle 506 from for example, vector 502. A second discrete optically detectable element 508 is projected onto surface 210 at a second determinable angle 510. A third discrete optically detectable element 512 is projected onto surface 210 at a third determinable angle 514. Although illustrated as using three discrete optically detectable elements projected onto surface 210, any number of discrete optically detectable elements may be used to ensure sufficient resolution along surface 210 to accurately discern variations in a dimensional parameter of surface 210 being measured.

Imager 125 receives images of the discrete optically detectable elements 504, 508, and 512 at respective angles 516, 518, and 520. Each discrete optically detectable element 504, 508, and 512 forms a respective triangle with imager 125 and light source 124. For example, element 504 forms a triangle ABC, with imager 125 and light source 124, element 508 forms a triangle ABD, with imager 125 and light source 124, and element 512 forms a triangle ABE, with imager 125 and light source 124. For each triangle, the side AB is determinable, because during assembly of wheel servicing system 100 and/or wheel profile measurement system 123, imager 125 and light source 124 are positioned in a known or determinable relationship. For each triangle, two angles are determinable directly from the angle at which each element is emitted from light source 124 and the angle from which the element is received by imager 125. Using the Law of Sines, any other side or angle of each respective triangle can be determined. The position of each discrete optically detectable element is determined based on its determined position with respect to imager 125 and light source 124.

Figure 4:
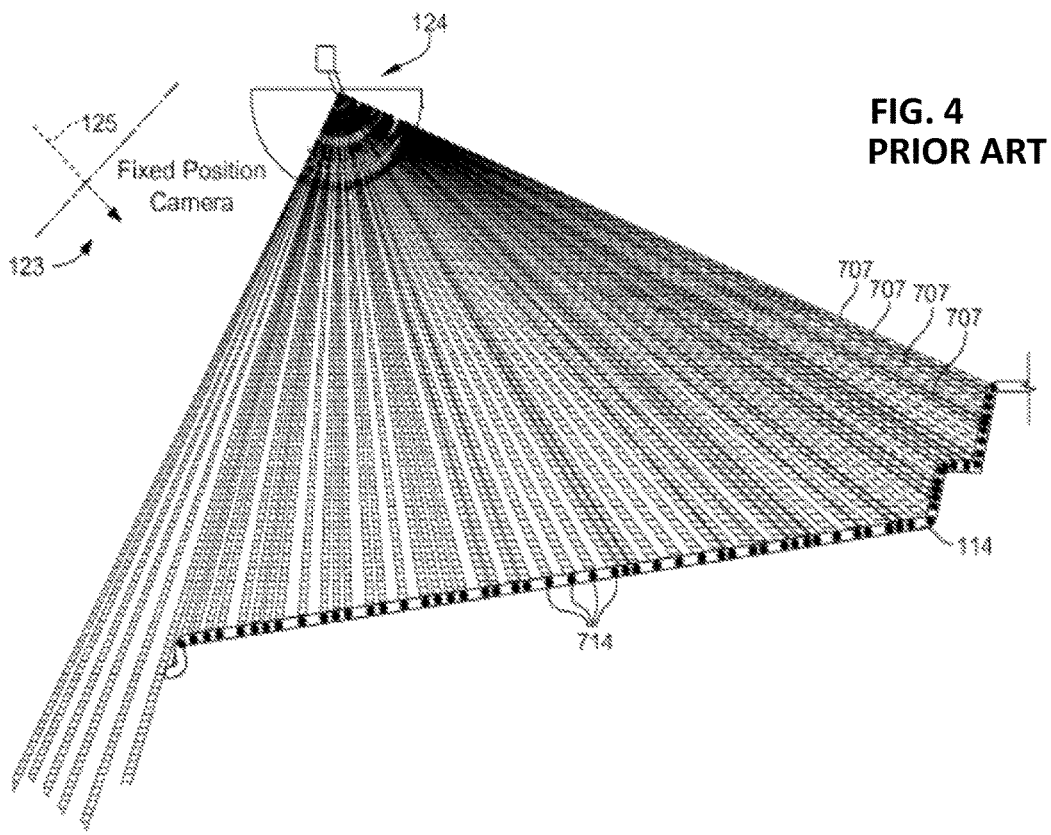
FIG. 4 is a schematic view of the prior art wheel profile measurement system shown in FIG. 1 and an enlarged portion of the wheel rim in accordance with another embodiment of the present invention.

FIG. 4 is a schematic view of the prior art wheel profile measurement system 123 in which optically detectable elements 714 appear as discrete dots on wheel rim 114 projected along discrete ray paths 707, which are spaced based on optical parameters of light source 124. Elements 714 are displayed in a binary-coded spacing, such as shown in the '837 Douglas et al. patent, where the spacing between them varies according to predetermined optical parameters of light source 124. Such spacing provides improved ability to determine where in the ray fan (which yields the known projected angle) each dot in the image is located, even when many of the dots fail to appear in the acquired image. In fact, only a small grouping of dots (for example, eight), which reliably appear in the image are all that is needed to assist in determining the remainder of the dots in the image. In one embodiment, for constant focus reasons, a ray fan of dots generated by a laser beam and diffractive optical element (DOE) is used. However, the pattern of optically detectable elements is not limited to being generated in this manner. For example, one or more additional rows of optically detectable elements may be projected in parallel to the first row. By providing the additional rows of dots with a different encoding, pattern, or offset spacing, the accuracy and reliability of identification for individual optical elements in resulting images can be improved through a cross-reference analysis.

An exemplary prior art method for determining a dimensional parameter of vehicle wheel 112 mounted on shaft 102 having axis of rotation 103 includes projecting a predetermined pattern of a plurality of discrete optically detectable elements onto the wheel assembly surfaces. The predetermined pattern is defined by geometric parameters of the light source projecting the discrete elements onto the wheel or by an aperture or DOE used in conjunction with the light source. A dimensional parameter or feature of the wheel at an axial and radial position of at least two of the plurality of discrete elements is then determined. The determined dimensional parameter may be a contour profile of the wheel surface illuminated by the projected pattern, determined using the determined dimensional parameters acquired at a plurality of spaced locations along the axis of rotation. Alternatively, the determined dimensional parameter or feature may include for example, at least a portion of the profile of the wheel, dimensions of the wheel such as a tire size, an aspect ratio, a width and a diameter, and/or an offset of the wheel rim from the mounting location on the spindle shaft.

Figure 6:
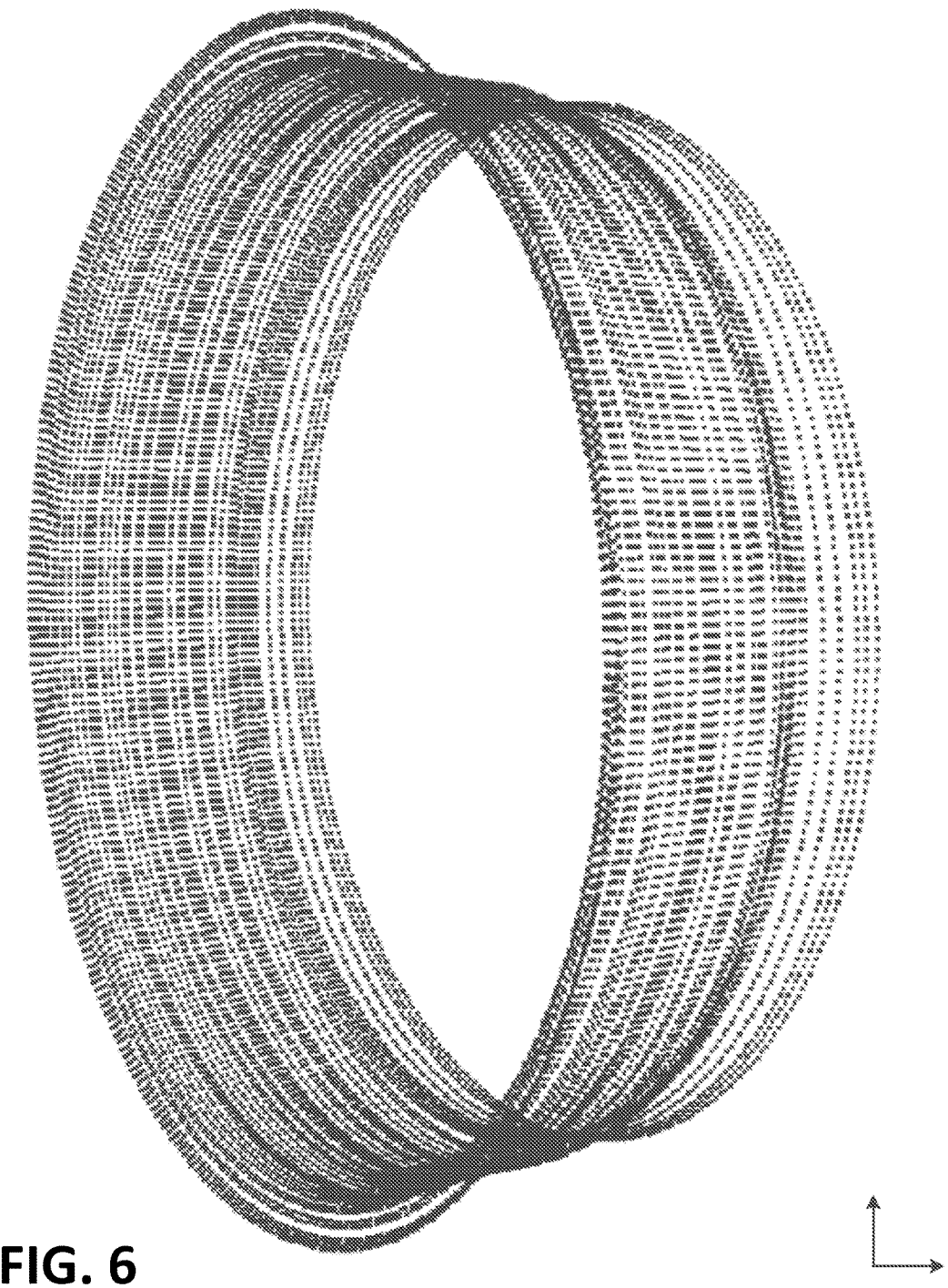
FIG. 6 is a three-dimensional view of wheel assembly profile data acquired from the inner circumference of a wheel rim surface, shown in a cylindrical coordinate system.
Figure 7:
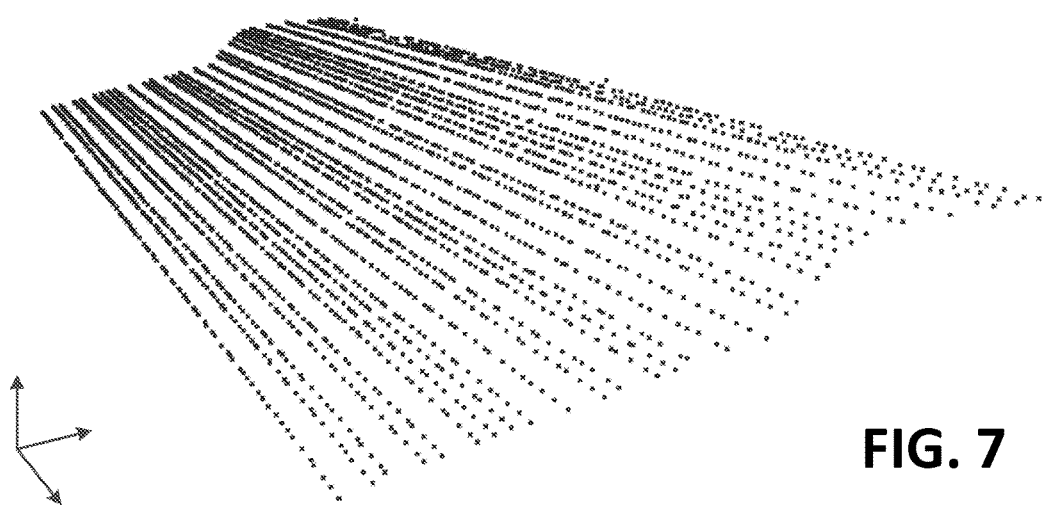
FIG. 7 is a surface plot of the profile data of FIG. 6, shown in a Cartesian coordinate system.

By acquiring image data while the wheel assembly 112 is rotated about the axis of the shaft 102, a set of images of the projected pattern of optically discrete elements 714 on the surface of the wheel rim 114 is assembled (for example, 30 images spaced at 10-15 degrees intervals). The resulting data, representative of discrete regions of the wheel surfaces at the appropriate radial distances from the axis of rotation, can be evaluated to establish one or more profiles of the wheel surface regions, and illustrated in a cylindrical coordinate system as shown in FIG. 6, or a Cartesian coordinate system as shown in FIG. 7.

Once the wheel profile measurement system 123 acquires wheel assembly profile measurement data (i.e. contours), such as shown in U.S. Pat. No. 8,111,387 B2 to Douglas et al., the data may be processed and utilized in a variety of ways to identify features and/or characteristics of the vehicle wheel assembly 112, as set forth below.

In one embodiment, when activated, the wheel profile measurement system 123 observes one or more optically detectable elements 714 within the field of view. In a most basic function, the acquired data may be utilized by the vehicle service system 100 to identify the presence of, or absence of, a vehicle wheel 114 mounted to the spindle shaft 102 in the imaging sensor field of view 129. A lack of any observable optically detectable elements 714 in the field of view 129, or the detection of one or more optically detectable elements 714 on surfaces which would be occluded by the presence of a vehicle wheel 114 within an expected spatial volume, results in the establishment of profile data which can be interpreted by the processor 300 (or processor 110) as an indication that no vehicle wheel assembly 114 is currently mounted to shaft 102, i.e., as an absence of a vehicle wheel assembly.

The processor 300 (or processor 110) is configured with suitable software instructions to select an appropriate operational procedure in response to detecting the absence (or presence) of a vehicle wheel assembly 112 on the spindle shaft 102. For example, the processor 300 (or processor 110) can be configured with suitable software instructions to place the vehicle wheel servicing system 100 into a standby mode until such time when a wheel assembly 112 is observed in the field of view 129. Alternatively, if the absence of a wheel assembly 112 is identified at a point during a vehicle wheel service procedure where a wheel assembly 112 is expected to be present, and error condition or emergency condition may be identified, and the processor 300 (or processor 110) configured to implement operational procedures for an appropriate response (e.g., querying the operator, initiating shutdown, resetting a wheel service procedure, or placing the wheel service system 100 in standby mode, etc.) Preferably, detection of the presence or absence of a mounted vehicle wheel assembly 112 on the spindle shaft 102 occurs periodically and automatically, for example, enabling the vehicle wheel service system 100 to automatically detect and respond to the placement of a wheel assembly 112 on the spindle shaft 102 by an operator to initiate a new wheel service procedure.

In addition to detecting the presence of a vehicle wheel assembly 112 on the shaft 102 of the vehicle service system, the processor 300 (or processor 110) can be configured with suitable software instructions to determine basic parameters, characteristics, or features of a detected wheel assembly from the determined profile data, such as, but not limited to, rim diameter, runout, width, profile, spoke locations, spoke dimensions, and/or valve stem position as described further below. This information may be compared with corresponding information for a vehicle wheel assembly 112 previously mounted to the shaft 102 to determine if the same wheel assembly 112 (or a wheel assembly with the same configuration, such as from the same vehicle) has been re-mounted to the shaft 102.

It is a common practice for an operator to remove a wheel assembly 112 from the shaft 102 before completing a service procedure. For example, a wheel assembly 112 may be removed from the shaft 102 in order to alter the mounting of, or to replace, the tire 116 on the rim 114. The wheel assembly 112 is then returned to the shaft 102, and the service procedure completed. However, if there is a delay, a second operator might utilize the vehicle service system 100 to carry out a service procedure on a second wheel assembly before the first wheel assembly 112 is returned to the shaft 102. Identifying the mounting of a new (i.e., different) wheel assembly to the shaft 102 may be useful for tracking service system performance, usage statistics, and for producing accurate reports, etc.

Once the presence of a vehicle wheel assembly 112 on the shaft 102 of the vehicle wheel service system 100 has been identified by the processor 300 (or processor 110) using data acquired by the wheel profile measurement system 123, or otherwise indicated to the vehicle service system 100 by an operator, a mounting orientation of the wheel assembly 112 relative to the wheel service system 100 can be automatically detected as a feature or characteristic of the vehicle wheel assembly. Vehicle wheel assemblies 112 have an outer face and an inner face. The inner face is mounted towards the hub of a vehicle wheel end when the wheel assembly 112 is installed on a vehicle. During normal operation of a vehicle service system 100, a wheel assembly 112 should be installed on the shaft 102 with the inner face directed towards the wheel service system 100 and axial end of the shaft 102. Only under specific circumstances should the wheel assembly 112 be mounted in a "reverse" configuration.

Figure 9:
FIG. 9 is a Cartesian coordinate system surface plot of wheel assembly profile data for a wheel mounted in reverse, with the outside face (i.e. spokes) towards the shaft mounting face.

The wheel profile measurement system 123 is configured to determine a positional relationship between the imaging sensor and at least two of the plurality of discrete elements 714 from an acquired image in order to establish a profile of the surface on which the discrete elements are projected, as described in U.S. Pat. No. 8,111,387 B2 to Douglas et al. In an embodiment, the processor 300 (or processor 110) is further configured with suitable software instructions to evaluate the contour features of the established profile to determine if the vehicle wheel assembly 112 is mounted to the spindle shaft 102 in a normal mounting orientation or in a reverse mounting orientation. As seen in FIG. 9, an evaluation of the established profile contour features which include one or more abrupt vertical surfaces (i.e., spokes) at axial locations where a generally horizontal surface is expected, may be representative of a reverse mounted wheel assembly 112 on the shaft 102. Alternatively, if sufficient information is present in the acquired profile contour data to calculate a center plane of the wheel, the axial location of the center plane can be compared by the processor 300 (or processor 110) with an axial location of the shaft 102 mounting surface. For a normal mounting, the comparison will indicate that the wheel center plane is located axially inboard of the shaft mounting surface axial location. If the wheel center plane is located axially outboard of the shaft mounting surface axial location, the wheel has a reverse or improper mounting.

The processor 300 (or processor 110) may be configured with a set of program instructions to provide a suitable warning or message to the operator upon the detection of an improperly mounted wheel assembly 112, unless a procedure currently being implemented requires the wheel assembly 112 to be mounted to the shaft 102 in a reverse orientation. Conversely, if a specific procedure requires the wheel assembly 112 to be mounted to the shaft 102 in a reverse mounting, the processor 300 (or processor 110) may be configured to utilize the data from the wheel profile measurement system 123 to ensure that the wheel assembly 112 is mounted to the shaft 102 in the required orientation before proceeding with the wheel service procedure.

In a further embodiment, runout of the wheel assembly 112, the wheel rim 114, or the tire 116, in an axial direction and\or in a radial direction relative to the axis of rotation of shaft 102 can be determined as a feature or characteristic of the vehicle wheel assembly by the processor 300 (or processor 110) using profile contour data acquired by the wheel profile measurement system 123. To determine wheel rim runout measurements, a set of images of the projected pattern of optically discrete elements 714 on the surface of the wheel rim 114 is acquired as the wheel assembly 112 is rotated about the shaft axis of rotation (for example, 30 images spaced at approximately 10-15 degrees intervals). The images are evaluated to establish a set of corresponding profiles for the wheel assembly. A comparison of surface profiles acquired at different rotational positions of the vehicle wheel assembly 112 identifies a measure of runout present in various circumferential surfaces, such as inner and outer rim lips, bead seats, or rim surface between the different rotational positions. Alternatively, the acquired profiles may be mathematically processed by the processor 300 (or processor 110) configured with software instruction to establish an "average" profile for the wheel assembly 112.

Calculating an amount of radial and axial deviation between any observed profile of the wheel assembly 112 and the established "average" profile provides a measure of radial or axial runout, respectively, which is present at that location the wheel assembly 112 as mounted to the shaft 102. By associating each acquired profile with a rotational position of the wheel, such as with the use of an encoder operatively coupled to the shaft 102 on which the wheel assembly 112 is mounted, specific points or regions of runout can be positively identified to an operator and/or utilized during a vehicle wheel assembly service procedure as is known in the art. Similar procedures may be utilized to determine wheel assembly runout measurements and/or tire runout measurements by acquiring data from suitable positioned illuminated points.

Figure 8:
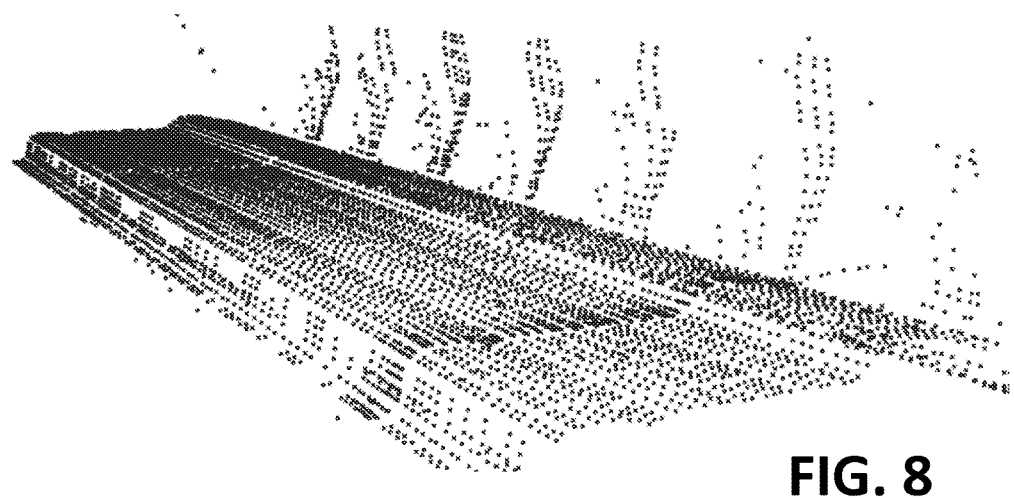
FIG. 8 is a surface plot of wheel assembly profile data including wheel spoke locations, shown in a Cartesian coordinate system.
Figure 10:
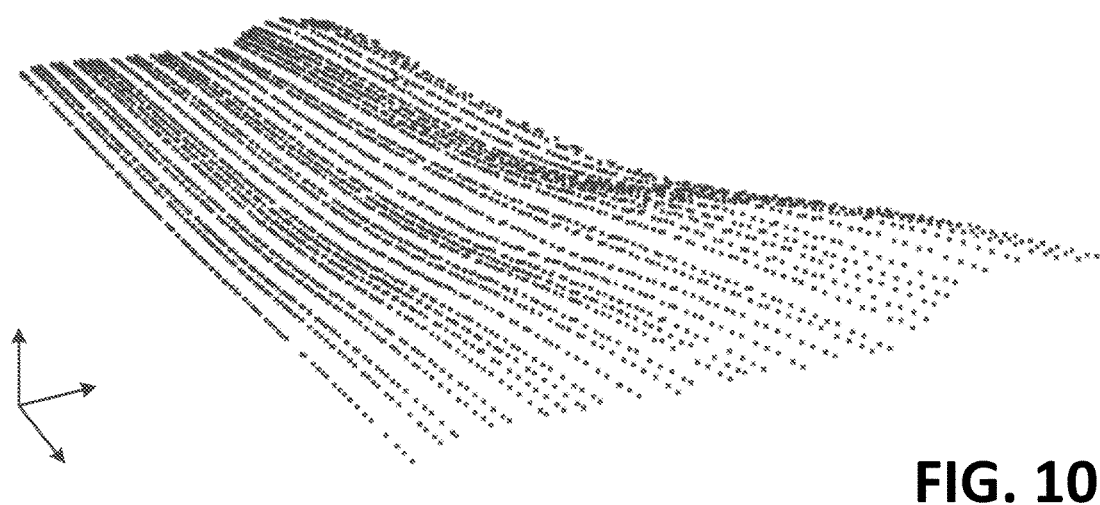
FIG. 10 is a surface plot of wheel assembly profile data similar to FIG. 7, illustrating both radial and axial runout.

Information related to runout may be optionally presented to the user on a display (FIG. 5) in a visual format by the processor 300 (or processor 110) through the use of a suitably programmed graphical user interface or display device. Plotting individual profiles (or linear arrangements of discrete optical elements 714) along a linear axis representative of rotational positions of the wheel assembly 112 between zero and 359 degrees provides a visual representation of runout. For an "ideal" wheel assembly 112, optimally mounted to the shaft 102, with a uniform surface profile, and no axial or radial runout, the plot of the profiles will be a flat surface representation of the wheel assembly 112 contour, as shown in FIGS. 7 and 8, as if the annular representation of the wheel assembly (FIG. 6) had been cut and unrolled onto a flat surface. If axial or radial runout is present in the wheel assembly 112 as mounted to the shaft 102, the plot will exhibit a smooth surface undulation in one or two directions, as shown in FIG. 10, corresponding to the high and low locations of any axial or radial runout about the circumference of the wheel assembly 112. By exaggerating the scale of the displayed data, these smooth undulations can be made visible to an operator, and used to guide corrective adjustments to the wheel assembly 112 as is known in the art.

In some situations, the observed runout is a result of a miss-centered mounting of the vehicle wheel assembly 112 to the shaft 102. Information related to the observed runout characteristic of a vehicle wheel assembly 112 may optionally be utilized by the processor 110 when configured with suitable software, to compensate various measurements associated with the vehicle wheel assembly 112 for the effect of the miss-centered mounting, enabling an operator to complete a vehicle wheel service procedure without the need to stop and re-mount or re-center the vehicle wheel assembly 112 on the shaft 102. For example, taking runout readings, measurements of phase and magnitude of a first harmonic, as well as measurements of phase and magnitude of imbalance on multiple spins enables the magnitude of miss-centering to be calculated and compensated for by the processor 300 (or processor 110). This accommodates an operator who either by accident or omission employs a less-than-ideal adaptor for mounting the vehicle wheel assembly 112 to the shaft 102, while still obtaining usable centering results by using multiple spins of the wheel assembly to average or cancel introduced mounting errors.

Wheel assembly runout characteristic information may be utilized by the processor 110 of the vehicle service system 100 to identify or monitor changes in the mounting of a wheel assembly onto the spindle shaft of the vehicle service system. By comparing the observed runout of the wheel assembly 112 on the spindle shaft 102 at a first point in time with the observed runout of the wheel assembly 112 on the spindle shaft 102 at a second point in time during a vehicle wheel service procedure, changes in either the magnitude or phase of the observed runout relative to the axis of rotation 103 can be identified, which are indicative of a change in the mounting of the wheel assembly 112 on the spindle shaft 102 (assuming the physical configuration of the wheel assembly 112 is an invariant).

Runout which results from deviations in the shape of the wheel rim 114 from a perfect circle can be utilized by the vehicle service system 100 to "index" a wheel assembly 112 to a specific rotational orientation. Commonly, the rotational position of an installed valve stem is utilized to provide a vehicle service system 100 with an "index" position for establishing the rotational position of a vehicle wheel assembly 112 on the spindle shaft 102. For vehicle wheel assemblies 112 having a measured runout due to deviations in the shape of the wheel rim 114, the entire runout profile, a selected portion of the runout profile, or the measured high or low point of the runout profile can be utilized to establish the "index" position relative to which the wheel assembly 112 rotational position is determined.

Data from the wheel profile measurement system 123 which is acquired and processed by the processor 300 (or processor 110) from a plurality of discrete rotational positions of the wheel (i.e., data acquired while the wheel assembly 112 is rotated about the axis of the shaft 102) can be utilized to detect the presence of various non-circumferential features or characteristics of the vehicle wheel assembly 112. Non-circumferential features or characteristics include, but are not limited to: installed imbalance correction weights; wheel spokes; installed valve stems; valve stem openings; wheel bolt holes; surface features such as dirt, stickers, or damage, and tire defects such as bulges, blemishes, or tread damage. To detect and/or identify non-circumferential features or characteristics of a vehicle wheel assembly 112, a set of images of the projected pattern of optically discrete elements 714 on the surface of the wheel rim 114 is acquired as the wheel assembly 112 is rotated about the shaft axis of rotation 103. Contour data from profiles acquired at different rotational positions of the vehicle wheel assembly 112 is compared to detect the presence, in one or more of the acquired profiles, of a non-circumferential feature or characteristic.

Figure 11:
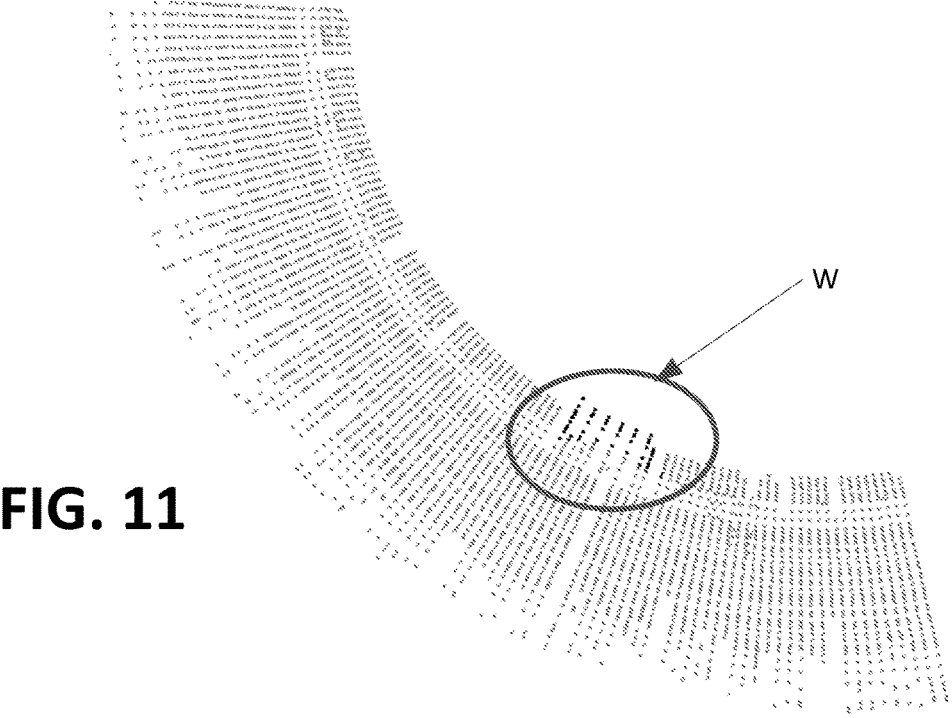
FIG. 11 is a partial surface plot of wheel assembly profile data similar to FIG. 6, illustrating the observation of an installed imbalance correction weight.
Figure 12:
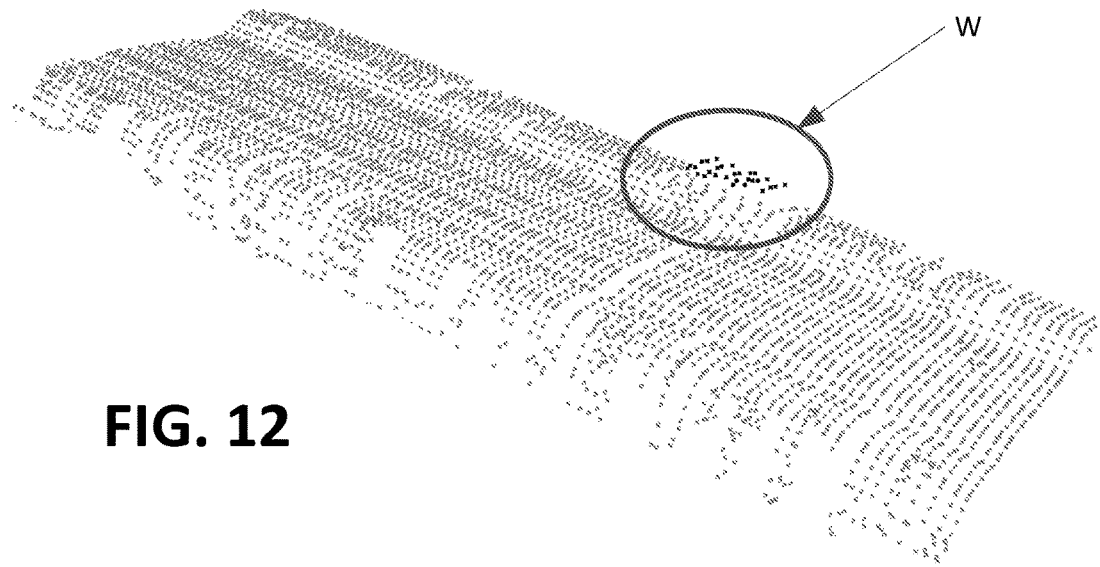
FIG. 12 is a surface plot similar to FIG. 11, show in a Cartesian coordinate system surface plot.

In one embodiment, a non-circumferential feature or characteristic is detected by identifying a candidate surface in one or more of the profiles, which is not present in other profiles acquired at different rotational positions of the wheel assembly 112. An installed imbalance correction weight may be detected in a set of profiles acquired in close proximity to each other by identifying, as shown at "W" in FIGS. 11 and 12, a raised candidate surface having abrupt edge transitions in the axial direction. Since the installed imbalance correction weight does not extend circumferentially around the complete inner surface of the wheel rim, profiles acquired from other areas of the wheel rim inner surface will not include any corresponding raised candidate surfaces W at the same axial location. The location of features such as wheel spokes and valve stems may be identified in substantially the same manner. An imaging sensor 125 located to provide a field of view of the outside surface of the vehicle wheel assembly can provide profile data associated with features on the outer surface of the vehicle wheel assembly 112, such as spoke outer surfaces, wheel rim edge profile (for selection of clip or tape weights based on the observed profile), valve stem, or tire sidewall features or damage.

Non-circumferential features or characteristics which exist as holes or depressions in the wheel rim or tire surfaces, such as valve stem openings, bolt holes, spoke openings, or tire tread damage can be identified by the detection of recessed surfaces or voids in a subset of the acquired profiles, which are not present in other acquired profiles obtained from different rotational positions about the wheel rim surface.

It will be recognized that the wheel profile measurement system 123 may encounter difficulty in identifying non-circumferential edges aligned parallel to the wheel axis of rotation (i.e. aligned with the line of projected discrete optical elements), or edges which are occluded from illumination, and as such, the wheel profile measurement system 123 may be unable to detect or identify all edges of a feature such as an installed imbalance correction weight or the width of a wheel spoke. However, if at least one profile intersects the non-circumferential feature of the vehicle wheel assembly 112, and at least two additional profiles do not, the processor 300 (or processor 110), configured with suitable software instructions, can perform a profile comparison to detect the presence of the non-circumferential feature on the wheel assembly at the rotational position of the intersecting profile.

Often, the specific dimensions of the detected non-circumferential feature or characteristic are of less importance than the mere detection itself. For example, the wheel profile measurement system 123 can be utilized to simply detect the presence of any installed imbalance correction weights before beginning an imbalance measurement procedure. The specific location of the installed weights may be less relevant than the need to provide an operator with a reminder of their presence. Similarly, the wheel profile measurement system 123 can be utilized to confirm that an operator has actually installed an imbalance weight at an identified rotational position on the wheel assembly 112, by acquiring a profile of the identified rotational position during a check spin and comparing it with a previously acquired profile of the wheel assembly 112 or by the detection of one or more sharp edge transitions at the approximate axial location where the operator was directed to installed the imbalance correction weight.

By using the feature detection ability of the wheel profile measurement system 123 to either identify the edges of installed imbalance correction weights, or to enable an approximation of the weight size (based on an observed height and width) to within an accepted tolerance, the processor 300 (or processor 110), configured with suitable software instructions, may estimate the amount of the imbalance correction weight installed at each identified location on the vehicle wheel. Known or estimated amounts of installed imbalance correction weights, and the associated installation locations on the wheel rim which are determined from the wheel profile measurement system data, or which are manually input by an operator, may be taken into consideration during an imbalance correction procedure. For example, the processor 300 (or processor 110) may be configured with suitable software instructions to recommend relocation of an installed imbalance correction weight on the surface of the wheel rim instead of, or in conjunction with, installation of additional imbalance correction weights as necessary to correct a measured imbalance. Similarly, the processor 300 (or processor 110) may be configured with suitable software instructions to identify a suitable installation location for a new or additional imbalance correction weight onto the wheel rim at a location which does not interfere with an already installed imbalance correction weight, using imbalance correction weight placement algorithms well understood in the art.

Identification of a unique non-circumferential feature or characteristic on a vehicle wheel assembly 112 can be utilized by the vehicle service system 100 as a reference or index mark. For example, the processor 110 or 300, configured with suitable software instructions, can correlate the rotational position of the wheel assembly 112 on the shaft 102 (using an encoder signal) with the detection of a unique non-circumferential feature such as an installed valve stem, valve stem opening, observed dirt or surface contamination patterns, or observed damage on the wheel surface. By tracking subsequent rotation of the vehicle wheel assembly 112 about the axis of rotation 103 of the shaft 102, the processor 110 or 300 can automatically direct rotation of the shaft and wheel assembly 112 to bring the wheel assembly 112 to a specific rotational position. This is useful in procedures when the operator is normally directed to rotate the wheel assembly 112 on the shaft 102, and avoids the need for the operator rotate the wheel manually to bring the valve stem to a top dead center rotational position. Similarly, this could be useful in any procedure where the operator is normally required to manually rotate the wheel on the shaft 102 so the wheel assembly 112 is returned to a previous rotational location.

It will be recognized that identification of non-unique non-circumferential features or characteristics on a vehicle wheel assembly 112, such as spokes, can be utilized by the vehicle service system 100 as a reference or index marks. For example, it may be beneficial to know the rotational position of each wheel spoke for purposes of determining placement locations for imbalance correction weights, such as utilized in U.S. Pat. No. 7,686,403 B2 to Douglas. However, absent some unique identifier, these references or index marks cannot be utilized by the processor 300 (or processor 110) to determine a unique rotational position of the vehicle wheel about the axis 103 of the spindle shaft 102.

Both unique circumferential features or characteristics, and non-unique circumferential features or characteristics, which are detected and/or identified may be utilized to monitor movement, between measurements, of the mounted wheel assembly 112 relative to the axis of the shaft 102. The processor 300 (or processor 110) may be configured with software instructions to monitor the position of detected and/or identified features, and to provide a response if a rotational position or radial position of those features is observed to change by more than a permissible tolerance during a wheel assembly service procedure. A chance in the rotational or radial positions over time may be indicative of a loose or improper mounting of the vehicle wheel assembly 112 to the spindle shaft 102. Detection and monitoring of the movement of a wheel assembly 112 may be utilized for a variety of purposes, such as set forth in U.S. Patent Application Publication No. 2014-0165721 A1 to Douglas which is herein incorporated by reference.

Vehicle service systems which include multiple wheel profile measurement systems 123, such as shown in FIG. 2B with a first measurement system disposed to observe inner wheel rim surfaces and inner tire sidewall surfaces, and a second measurement system disposed to observe outer wheel rim surfaces and outer tire sidewall surfaces can be configured to identify additional features or characteristics of a vehicle wheel assembly 112 mounted to the spindle shaft. Profile data acquired from inner and outer measurement systems can be utilized to independently identify axial and radial runout associated with each of the inner and outer rim lips of the wheel assembly. If the spatial locations and fields of view of each vehicle wheel profile measurement system 123 are calibrated such that a relationship between each is determined or characterized, the data acquired from each system 123 can be combined together by the processor 300 (or a processor 110) configured with suitable software instructions. Using the combined data, overall dimensions of the vehicle wheel assembly can be automatically measured by identifying the relative spatial locations of the inner and outer rim lips of the wheel assembly from the profile data acquired by each measurement system 123. Identification of the presence of a circumferential flange for receiving imbalance correction weights on one lip of a wheel assembly 112 can aid in identifying the presence of a circumferential flange in data representative of the opposite lip of the wheel assembly, by identifying the shape and radial location of the flange which is to be expected on the opposite lip. Data from an outer profile measurement system can be combined by the processor 300 (or processor 110) with data from an inner profile measurement system to provide a more complete representation of the features or characteristics of the wheel assembly 112, including tire surface characteristics, spoke locations, spoke thickness, a complete rim profile, the presence or absence of rim flanges, installed imbalance correction weights on the inner rim surface, the inner rim flange, and the outer rim flange, as well as the presence of any other non-circumferential features or discontinuities on the wheel assembly 112.

With a wheel assembly 112 mounted to the vehicle service system 100 shaft 102, data representative of operator input can be acquired from the wheel profile measurement system 123 and evaluated by the processor 300 (or processor 110). The operator input data can be in the form of a specific indication of a selected point along the projected pattern on the wheel rim surface 210, or may be in the form of a sliding or moving indication along the projected pattern on the wheel rim surface 112.

Figure 14:
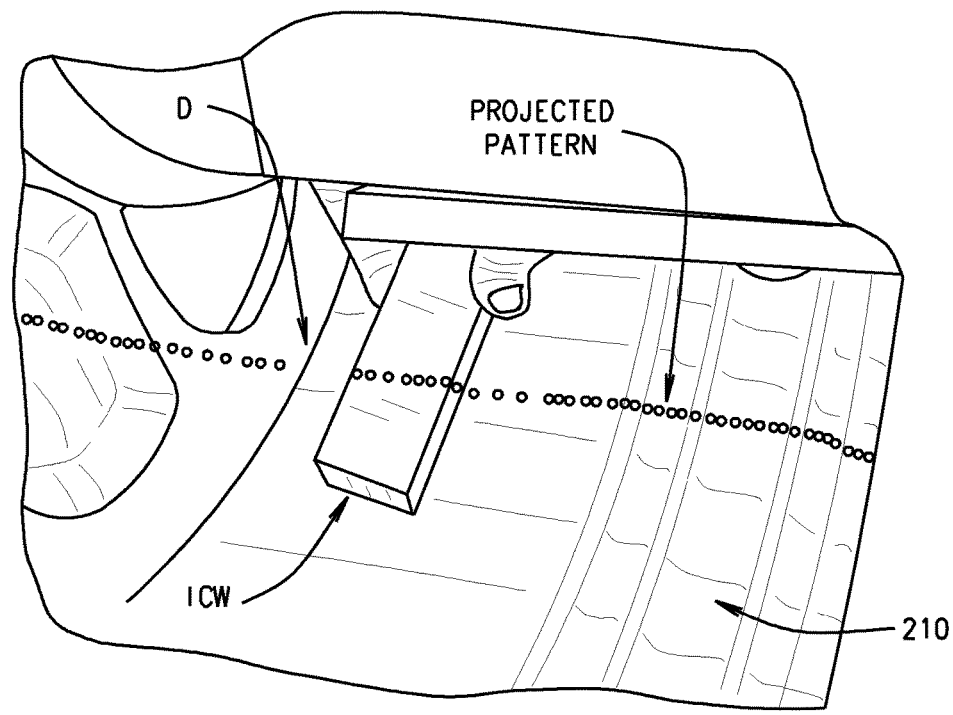
FIG. 14 is an illustration of an imbalance correction weight held adjacent to, and above, the wheel rim surface during the process of placement.

During a vehicle wheel service procedure, an operator may need to provide an indication to the vehicle service system 100 of a specific point on the surface of the wheel assembly 112, e.g. identifying a desired correction plane in which an imbalance correction weight is to be installed, or indicating a change in an automatically selected weight placement location. Utilizing the wheel profile measurement system 123, an operator can identify a specific point or location along the projected pattern of illuminated points 714 on the wheel assembly surface 210 by placing a finger or other suitable indicator object at the desired point or location to disrupt or interrupt the projected pattern on the wheel surface, as seen in FIGS. 14 and 15. The placement of the finger F or other suitable indicator object will alter the contour data of the feature profiles observed by the wheel profile measurement system 123, as some of the illuminated points 714 will be projected onto the operator's finger or other suitable indicator. Alternatively, the operator may utilize a finger F or other suitable opaque object, such as an imbalance correction weight (ICW) to block a portion of the projected pattern from reaching the surface 210 of the wheel rim, without the need to touch or contact the rim surface, thereby expanding a gap or disruption D in the observed pattern the illuminated points. The processor 300 (or processor 110) is configured with suitable software instructions to interpret the observed disruption, changes, or gap D in the contour data associated with the observed wheel assembly profile, as an operator input and/or as a selection of the indicated point or location on the wheel assembly surface 210. The processor response to the operator input is dependent upon the specific wheel service procedure currently being carried out, and may include the establishment of a weight correction plane at the indicated location, moving an established weight correction plane to the indicated location, or providing a display of imbalance correction weights and resulting imbalance values for the wheel assembly corresponding to a placement of an imbalance correction weight at the indicated location.

The optical projection system 124 and imaging system 125 for acquiring vehicle wheel assembly surface contour information may be further utilized in a vehicle wheel service system 100, such as a wheel balancer, to provide an operator with guidance as to an axial placement location for an imbalance correction weight on the surface (or lip) of a wheel assembly rim. Within the vehicle wheel service system 100, the processor 300 (or processor 110) is further configured with software instructions to control the optical projection system 124 to illuminate the wheel rim surface 210 at an identified axial location for placement of a calculated imbalance correction weight, such as when the vehicle wheel assembly 112 is rotated to a selected rotational position. For example, with the wheel assembly 112 rotated such that the imbalance correction weight placement location is at bottom dead center.

Figure 13:
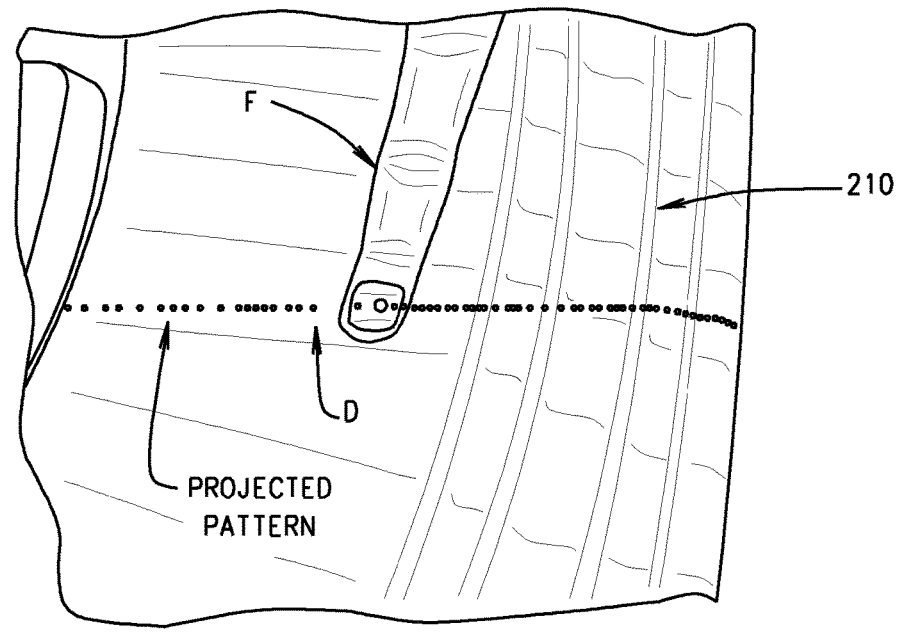
FIG. 13 is an illustration of an operator indication of an imbalance correction plane by selection of an illuminated point on the wheel surface.

Utilizing the optical projection system 124 to illuminate an axial placement location for an imbalance correction weight, as distinguished from utilizing a dedicated marking laser or other light source, permits the processor 300 (or processor 110) to be further configured with software instructions to receive and process images acquired by the imaging system 125 in which an object, such as a portion of an operator's hand, finger (F), or imbalance correction weight (ICW), is present, such as shown in FIGS. 13 and 14. If the object is held adjacent to, or positioned in contact with the rim surface 210 within the imaged field of view, the object will appear as a disruption or change D in the appearance of the determined contour data for a wheel assembly profile at a position which is located axially along the rim surface 210 at the rotational position of the projected pattern of points 714. With appropriate software instructions, the processor 300 (or processor 110) can evaluate the axial location of the observed disruption or change D, and compare it to the intended axial placement location for the imbalance correction weight on the surface 210 or lip of the wheel rim 114 at the current rotational position of the vehicle wheel assembly 112. The results of the comparison can be further utilized to provide feedback to an operator through a suitable interface.

This feedback may take the form of a warning to the operator if the observed disruption or change D does not correspond with the intended axial placement location to within a tolerance, or may be in the form of a confirmation signal in the event that the observed disruption or change is aligned with the intended axial placement location to within a tolerance. Similarly, if the object is observed in a sequence of acquired images to be moving towards or away from the intended axial placement location, such as by an action of the operator in bringing an imbalance correction weight to an intended placement location, the processor 110 (or processor 300) may be configured with suitable software instructions to provide feedback in the form of a varying output to the operator in order to facilitate alignment with the intended axial placement location. For example, an audible output in the form of a tone or beeping can be generated which changed in frequency or intensity as the object is tracked towards or away from the intended axial placement location. Alternatively, the processor 110 (or processor 300) may be suitable configured with software instructions to provide feedback in the form of visual output by controlling the optical projection system 124 to alter or vary the illumination of the wheel assembly 112, such as by flashing or pulsing the illumination, varying the intensity of the illumination, or selectively illuminating or blocking illumination of, portions of the rim surface 210.

With proper control, the illumination, either from the optical projection system 124 or an independent illumination source, can be controlled by the processor 110 (or processor 300) to provide an optical illusion of movement, indicating the direction in which the object should be moved to bring it into alignment with the intended axial placement location. Control of the illumination can be either direct control of the source of illumination (i.e. laser emitter or LED) by the processor (110 or 300), or may through processor control of a shutter or filter disposed within the optical path, such as an LCD shutter under control of the processor (110 or 300) to selectively block illuminating light rays 707.

In a further embodiment of the present disclosure, a vehicle wheel service system 100, such as a wheel balancer system, with an optical projection system 124 and imaging system 125 is configured to utilize the optical projection and imaging systems during a vehicle wheel assembly imbalance measurement and correction procedure to confirm that the operator has installed a selected imbalance correction weight on the vehicle wheel assembly 112 at an intended placement location. This placement location may correspond to a longitudinal center of the imbalance correction weight, a lateral center of the imbalance correction weight, or a peripheral edge of the imbalance correction weight which can be detected during rotation of the wheel assembly 112 by the interruption of the illuminating light pattern at the weight edge. The vehicle wheel service system 100 may be additionally configured to utilize the imaging sensor 125 to acquire images from which it is possible to determine, from identified edges, contours, or 2D images, if the imbalance correction weight is placed at the correct orientation, has the correct number of rows (for a multi-row installation), and if an observed profile of the installed imbalance correction weight matches the profile for an identified imbalance correction weight type.

The processor 110 (or processor 300) is configured with software instructions to evaluate an acquired image of an illuminated surface of the wheel rim 210 (such as a linear region, line, stripe, pattern, or sequence of illuminated points) which includes the intended placement location, to obtain a current surface profile, which can then be either evaluated individually, or compared against a previously acquired surface profile for the same location, to identify as a feature or characteristic of the wheel assembly at that location, the presence of changes or discontinuities D which are indicative of the shape or placement of an imbalance correction weight or other object on the rim surface 210.

The processor 110 (or processor 300) of the vehicle wheel service system 100 is preferably configured to confirm that a detected imbalance correction weight is installed on the wheel rim 210 to within a tolerance of the intended axial placement location, and may optionally be configured to confirm that the imbalance correction weight is optimally positioned on the wheel rim 210 in a circumferential direction at the intended placement location. The vehicle wheel service system processor may be configured to provide a suitable warning to an operator if the installation position of an imbalance correction weight on the wheel rim 210 is found to be outside of a permissible tolerance from an intended placement location. Optionally, if an additional imbalance correction weight is to be installed, the vehicle wheel service system processor may be configured to adjust the weight amount and/or an intended placement locations for any yet uninstalled imbalance correction weights on the wheel rim 210 in order to correct for imbalance resulting from an imbalance correction weight installed outside of the permissible tolerance of an intended placement location on the wheel rim 210.

By comparing a stored profile of a linear region of the rim surface contour obtained prior to the installation of an imbalance correction weight (typically during an imbalance measurement step), with a profile of the rim surface contour obtained after the installation of the imbalance correction weight, the processor 300 (or processor 110) in one embodiment is configured to identify the presence of, and at least an axial placement location for, the installed imbalance correction weight. The identified axial placement location of the installed imbalance correction weight is further compared by the processor with the axial location of the intended placement location, which then responds accordingly based on software instructions.

For example, the processor 110 (or processor 300) may be configured with software instructions to respond to the comparison results by providing a positive feedback signal upon detecting the installation on the wheel rim 210 of the imbalance correction weight to within a tolerance at the intended placement location, or by providing a negative feedback signal upon detecting the installation on the wheel rim 210 of the imbalance correction weight exceeding a distance tolerance from the intended placement location. The feedback may vary in response to, or be representative of, an axially aligned direction of a deviation from the intended placement location and/or in response to a measure of any such axially aligned deviation. Alternatively, the processor may be configured to proceed with an imbalance correction procedure without providing any feedback if the imbalance correction weight is located to within a tolerance of the intended placement location on the wheel rim 210.

If a second imbalance correction weight is intended to be installed on the vehicle wheel assembly 112, or if placement of the first imbalance correction weight necessitates installation of a second imbalance correction weight for proper balance correction of the wheel assembly 112, the processor 110 (or processor 300) may be configured to alter, adjust, or identify an intended placement location (or weight amount) for the second imbalance correction weight either in response to the identified axial placement location on the wheel rim 210 of the installed imbalance correction weight, or in real-time during positioning of the first imbalance correction weight, thereby avoiding the need for the operator to remove and reinstall the first imbalance correction weight if it is misplaced during installation. The intended placement location on the wheel rim 210 for the second imbalance correction weight may be displayed to the operator through a suitable display component, and may provide a real-time visualization in response to observed changes in the placement position of the first imbalance correction weight. Such a real-time visualization enables an operator to better understand how a change in the placement location on the wheel rim 210 of the first imbalance correction weight will alter the need for, and properties of, a second imbalance correction weight to be installed on the vehicle wheel assembly 112.

Those of ordinary skill in the art will recognized that while the present disclosure has been described in association with embodiments of vehicle service systems 100 utilizing a projected pattern of illuminated points on the surfaces of a vehicle wheel assembly 112 to acquire associated data, absent a specific requirement of utilizing illuminated points, various other means of acquiring the data associated with the surfaces may be utilized without departing from the scope of the invention. For example, the imaging system need not be limited to acquiring images of illuminating laser light reflected from the wheel rim 210, and with suitable optical components, may be configured to acquire 2D images of objects such as the operator's hand or an imbalance correction weight within an associated field of view, illuminated by ambient light.

The term processor, as used herein, refers to one or more central processing units, microprocessors, microcontrollers, reduced instruction set circuits (RISC), application specific integrated circuits (ASIC), logic circuits, and any other circuit capable of executing the functions described herein when configured with suitable software instruction or firmware programming. As used herein, the terms "software" and "firmware" are interchangeable, and include any computer program or instruction set stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A service system for a vehicle wheel assembly having an inner surface and an outer surface, the service system comprising:
   a spindle shaft configured to receive the vehicle wheel assembly for rotation about an axis;
   at least one source of optical energy configured to project at least one pattern of light defining a plurality of non-continuous discrete optically detectable elements towards the inner surface or the outer surface of the wheel assembly;
   an imaging sensor configured to acquire a plurality of images of the plurality of non-continuous discrete optically detectable elements projected on the wheel assembly surface, at least two of said images acquired at different rotational orientations of the wheel assembly as the vehicle wheel assembly is rotated about said axis; and
   a processor configured with program instructions to:
      a) determine spatial positions for at least two of the plurality of non-continuous discrete optically detectable elements on the wheel assembly surface from at least two of the acquired images;
      b) determine a plurality of axial profiles associated with the wheel assembly surface based on the determined spatial positions from the acquired images;
      c) determine a representative axial profile associated with at least a portion of the wheel assembly based on the determined plurality of axial profiles; and
      d) identify at least one observed feature of the wheel assembly using contour elements present in at least one determined axial profile representing a displacement of the wheel assembly surface from said representative profile.

2. A system in accordance with claim 1 wherein said feature is at least one of an index marker, an installed valve stem, a wheel spoke, a valve stem receiving bore, a bolt hole, surface-adhered material, or wheel rim surface damage.

3. A system in accordance with claim 1 wherein said feature is an installed imbalance correction weight; and
   wherein said processor is further configured with program instructions to identify from determined plurality of axial profiles at least one characteristic of said installed imbalance correction weight, said characteristic selected from a set of characteristics including a placement position on said wheel assembly, a placement orientation on said wheel assembly, spatial dimensions, and a weight style.

4. A system in accordance with claim 1 wherein said identified observed feature is an observed axial position along said spindle shaft, of a hub face of the vehicle wheel assembly relative to an observed axial position along said spindle shaft, of at least one rim edge of the vehicle wheel assembly;
   wherein said processor is further configured with program instructions to identify a reverse axial mounting orientation of said vehicle wheel assembly on said spindle shaft from said identified observed feature; and
   wherein an outside hub face of the wheel assembly is disposed axially closer to the balancer than an inside hub face of the wheel assembly.

5. A service system for a vehicle wheel assembly having an inner surface and an outer surface, the service system comprising:
   a spindle shaft configured to receive the vehicle wheel assembly for rotation about an axis;
   at least one source of optical energy configured to project at least one pattern of light defining a plurality of discrete optically detectable elements towards the inner surface or the outer surface of the wheel assembly;
   an imaging sensor configured to acquire a plurality of images of the plurality of discrete optically detectable elements projected on the wheel assembly surface, each image acquired at a different rotational orientation of the wheel assembly as the vehicle wheel assembly is rotated about said axis of rotation of the spindle shaft;
   a processor configured with program instructions to:
      determine a spatial position of at least two of the plurality of non-continuous discrete optically detectable elements from each of the acquired images;
      determine a plurality of profiles associated with the wheel assembly based on the determined spatial positions from each of the acquired images; and
      determine, as a characteristic of the wheel assembly, a representation of observed runout present in the wheel assembly surface at a selected rotational position, using contour elements present in the plurality of determined profiles to establish an average profile, and wherein said observed runout is represented by a displacement of the wheel assembly surface at said selected rotational position from said average profile.

6. A system in accordance with claim 5 wherein said wheel assembly surface is a circumferential surface of the vehicle wheel assembly selected from a set of circumferential surfaces including an inner rim edge, an outer rim edge, an inner bead seat, an outer bead seat, a tire surface, or an imbalance correction weight placement surface.

7. A system in accordance with claim 5 wherein said representation of runout is a representation of an axial runout and/or a radial runout present in the wheel assembly surface.

8. A system in accordance with claim 5 wherein said processor is further configured with program instructions to compare a first determined representation of runout with a second determined representation of runout to identify a change in at least one of a phase and a magnitude there between, said change representative of a change in mounting of the vehicle wheel assembly on the spindle shaft having occurred between said first and second determinations of runout.

9. A method for operating a vehicle wheel service system including a spindle shaft for receiving a vehicle wheel assembly for rotation about an axis, comprising:
   projecting, from at least one source of optical energy, at least one pattern of light including a plurality of non-continuous discrete optically detectable elements, towards a spatial region expected to contain a surface of a vehicle wheel assembly mounted to the spindle shaft;
   acquiring, with an imaging sensor, a plurality of images of the spatial region, at least two of said images acquired at different rotational orientations of the wheel assembly as the wheel assembly is rotated about said axis;

evaluating at least two of said acquired images, by
identifying at least two of said plurality of non-continuous discrete optically detectable elements within said acquired image;
determining spatial positions for said identified non-continuous discrete optically detectable elements; and
determining a surface profile of the wheel assembly based on the determined spatial positions;
comparing a set of said determined surface profiles of the wheel assembly to detect at least one non-circumferential contour feature on the wheel assembly surface; and
identifying at least one observed feature of the wheel assembly directly from at least one detected non-circumferential contour feature present within the set of determined surface profiles.

10. A method for operating a vehicle wheel service system including a spindle shaft for receiving a vehicle wheel assembly for rotation about an axis, comprising:
projecting, from at least one source of optical energy, at least one pattern of light including a plurality of discrete optically detectable elements, towards a spatial region expected to contain a surface of a vehicle wheel assembly mounted to the spindle shaft;
acquiring, with an imaging sensor, at least one image of the spatial region;
evaluating the acquired image, by
identifying said plurality of discrete optically detectable elements within said acquired image;
determining spatial positions for said identified discrete optically detectable elements; and
determining a surface profile based on the determined spatial positions;
wherein said steps of acquiring and evaluating are repeated at least once for a plurality of images each obtained at a different rotational orientation of the vehicle wheel assembly as the vehicle wheel assembly rotates about the spindle axis of rotation;
identifying a measurement of an observed runout of a surface of a vehicle wheel assembly from contour features present in a plurality of determined profiles; and
further including the step of providing a representation of said observed runout present in said surface at a selected rotational position utilizing said plurality of determined profiles to establish an average profile, and wherein said observed runout is represented by a displacement of the wheel assembly surface at said selected rotational position from said average profile.

11. The method of claim 10 wherein said surface of the vehicle wheel assembly is a circumferential feature of the vehicle wheel assembly selected from a set of circumferential features including an inner rim edge, an outer rim edge, an inner bead seat, an outer bead seat, a tire surface, or an imbalance correction weight placement surface.

12. The method of claim 10 wherein said representation of observed runout is a representation of an axial runout and/or a radial runout of said surface of the vehicle wheel assembly.

13. The method of claim 10 wherein said representation of observed runout is identified at least twice for a vehicle wheel assembly;
wherein said representations of said observed runout are compared with each other to identify any changes in at least one of a magnitude or a phase there between; and
wherein said changes in said magnitude and/or phase of said observed runout of the vehicle wheel assembly are indicative of a change in a mounting of said vehicle wheel assembly on said shaft.

14. The method of claim 9 wherein said at least one observed feature is at least one of, a location of a valve stem receiving bore, a bolt hole, a surface-adhered material, or wheel rim damage.

15. The method of claim 9 wherein said at least one observed feature is an installed imbalance correction weight on said wheel assembly surface; and
further including the step of identifying from said at least one detected non-circumferential contour feature present within the set of determined profiles, at least one characteristic of said installed imbalance correction weight, said characteristic selected from a set of characteristics including a spatial dimension of said installed imbalance correction weight, an amount of said installed imbalance correction weight, and a style of said installed imbalance correction weight.

16. The method of claim 9 wherein an initial profile of said wheel assembly surface is established from said set of said determined surface profiles in response to an absence of any detected non-circumferential contour features;
wherein said steps of projecting, acquiring, evaluating and comparing are repeated at least once following establishment of said initial profile;
wherein responsive to a detection of at least one non-circumferential contour feature on the wheel assembly surface following establishment of said initial profile, interpreting said non-circumferential contour feature as an indicator object, and an axial position of said indicator object relative to said initial profile and as an operator input.

17. A method for operating a vehicle wheel service system including a spindle shaft for receiving a vehicle wheel assembly for rotation about an axis, comprising:
projecting a pattern of optical energy containing a plurality of discrete elements towards a spatial region expected to contain a surface of a vehicle wheel assembly mounted to the spindle shaft;
acquiring, with an imaging sensor, at least one image of the spatial region, said image including optical energy reflected from said surface of a vehicle wheel assembly present within said spatial region;
evaluating the acquired image to determine a surface profile associated with said reflected optical energy;
identifying, from contour elements present in the determined profile, an initial profile of a rim surface of the vehicle wheel assembly onto which said optical energy is projected;
repeating the steps of projecting, acquiring, and evaluating at least once to identify at least one current profile of the vehicle wheel assembly rim surface;
detecting a change in a portion of said at least one current profile from said initial profile resulting from a placement of an indicator object between a source of said optical energy and said rim surface;
interpreting said change as an axial position of said indicator object relative to said determined initial profile, and as an operator input;
controlling said at least one source of optical energy to provide visual guidance for placement of an imbalance correction weight onto said vehicle wheel assembly rim surface in response to said interpreted axial position differing from a selected imbalance correction weight placement plane.

18. A method for operating a vehicle wheel service system including a spindle shaft for receiving a vehicle wheel assembly for rotation about an axis, comprising:
- projecting a pattern of optical energy containing a plurality of discrete elements towards a spatial region expected to contain a surface of a vehicle wheel assembly mounted to the spindle shaft;
- acquiring, with an imaging sensor, at least one image of the spatial region, said image including optical energy reflected from said surface of a vehicle wheel assembly present within said spatial region;
- evaluating the acquired image to determine a surface profile associated with said reflected optical energy; and
- identifying, from contour elements present in the determined profile, a surface contour of a wheel assembly rim suitable for attachment of an imbalance correction weight; and further including the steps of:
- measuring an imbalance associated with the vehicle wheel assembly;
- identifying at least one imbalance correction weight and an associated placement location on said vehicle wheel assembly based on said measured imbalance and said rim surface contour;
- activating said source of optical energy to illuminate a region on said rim surface;
- rotationally positioning said vehicle wheel assembly such that said associated placement location for said at least one identified imbalance correction weight intersects said illuminated region;
- observing said illuminated region with said imaging sensor and evaluating one or more resulting images to detect the presence of an object which is in proximity to, or placed on, said rim surface, and at least partially within said illuminated region;
- wherein said step of identifying at least one imbalance correction weight further identifies at least a second imbalance correction weight and a second associated placement location on said vehicle wheel assembly based on said measured imbalance and said identified rim surface contour;
- wherein said object is a first installed imbalance correction weight; and
- responsive to said first installed imbalance correction weight detected at a location which is spaced from said identified associated placement location by more than a tolerance, further including the step of altering at least one of said identified second imbalance correction weight and said identified second associated placement location to achieve an imbalance goal for the vehicle wheel assembly.

19. A method for operating a vehicle wheel service system including a spindle shaft for receiving a vehicle wheel assembly for rotation about an axis, comprising:
- projecting, from at least one source of optical energy, at least one pattern of light including a plurality of non-continuous discrete optically detectable elements, towards a spatial volume expected to contain a surface of a vehicle wheel assembly mounted to the spindle shaft;
- acquiring, with an imaging sensor, at least one image of the spatial volume;
- evaluating the acquired image, by
  - identifying at least two of said plurality of non-continuous discrete optically detectable elements within said acquired image;
  - determining, using at least one optical trait of said pattern of light, spatial positions for said identified non-continuous discrete optically detectable elements; and
- detecting an absence of a vehicle wheel assembly from said spindle shaft in response to said determined spatial positions for said identified non-continuous optically detectable elements corresponding to surfaces within said spatial volume occluded from a field of view of said imaging sensor by a presence of a vehicle wheel assembly on said spindle shaft.

20. The method of claim 16 wherein said axial position and said operator input identifies an imbalance correction weight placement plane of said vehicle wheel assembly; and
- further including the step of calculating at least one imbalance correction weight characteristic and residual imbalance value associated with the vehicle wheel assembly in response to said identification of said imbalance correction weight placement plane.

* * * * *